(12) United States Patent
Buchecker et al.

(10) Patent No.: US 6,632,909 B2
(45) Date of Patent: Oct. 14, 2003

(54) PHOTOCROSSLINKABLE POLYMERS

(75) Inventors: Richard Buchecker, Zurich (CH); Guy Marck, Schlierbach (FR); Andreas Schuster, Freiburg (DE); Hubert Seiberle, Weil am Rhein (DE)

(73) Assignee: Rolic AG, Zug (CH)

( * ) Notice: Subject to any disclaimer, the term of this patent is extended or adjusted under 35 U.S.C. 154(b) by 0 days.

(21) Appl. No.: 09/915,574

(22) Filed: Jul. 27, 2001

(65) Prior Publication Data

US 2002/0061996 A1 May 23, 2002

Related U.S. Application Data

(63) Continuation of application No. 09/027,862, filed on Feb. 23, 1998, now abandoned.

(30) Foreign Application Priority Data

Feb. 24, 1997 (EP) ............................................. 97102973

(51) Int. Cl.$^7$ ................................................ C08F 22/10
(52) U.S. Cl. ....................... 526/321; 526/319; 526/320; 526/326; 526/328; 428/689; 528/10; 528/26; 528/27; 528/28
(58) Field of Search ................................ 526/321, 319, 526/320, 326, 328; 428/689; 528/10, 26, 27, 28

(56) References Cited

U.S. PATENT DOCUMENTS

| | | | |
|---|---|---|---|
| 5,539,074 A | | 7/1996 | Herr et al. |
| 5,602,661 A | | 2/1997 | Schadt et al. |
| 5,650,534 A | | 7/1997 | Kelly et al. |
| 6,107,427 A | * | 8/2000 | Herr et al. .................. 526/319 |
| 6,277,502 B1 | * | 8/2001 | Buchecker et al. .......... 498/659 |
| 6,335,409 B1 | * | 1/2002 | Herr et al. .................. 526/319 |
| 6,340,506 B1 | * | 1/2002 | Buchecker et al. .......... 349/183 |

FOREIGN PATENT DOCUMENTS

| | | |
|---|---|---|
| EP | 0 611 786 A | 8/1994 |
| EP | 0 699 731 | 3/1996 |
| EP | 0 753 785 A | 1/1997 |
| EP | 0 763 552 | 3/1997 |
| JP | 46073369 | 8/1992 |
| WO | WO 94/00797 | 1/1994 |
| WO | WO 95/24455 | 9/1995 |

\* cited by examiner

Primary Examiner—Tatyana Zalukaeva
(74) Attorney, Agent, or Firm—Finnegan, Henderson, Farabow, Garrett & Dunner, LLP

(57) ABSTRACT

The present invention relates to polymers of the general formula I:

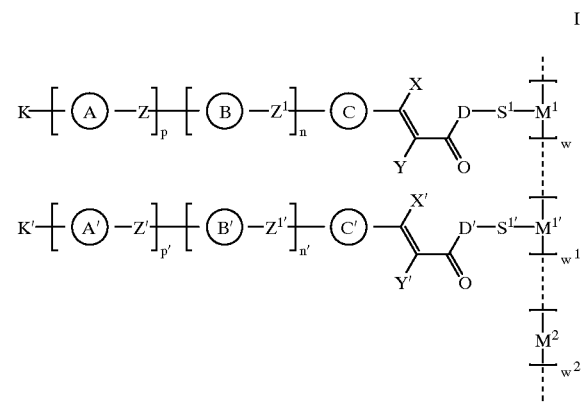

in which $M^1$, $M^{1'}$, $M^2$ denote a recurring monomer unit from the group: acrylate, methacrylate, 2-chloroacrylate, 2-phenylacrylate;

w, $w^1$, $w^2$ are molar fractions of the comonomers with $0<w\leq 1$, $0\leq w^1<1$ and $0\leq w^2\leq 0.5$;

$S^1$ and $S^{1'}$, independently of one another, denote a straight-chain or a branched alkylene group —$(CH_2)_t$—;

D, D', independently of one another, denote —O—;

X, X', Y, Y' independently of one another, denote hydrogen;

A, A', B, B' independently of one another, denote phenylene, which is C, C' unsubstituted or optionally substituted by fluorine, chlorine, cyano, alkyl, alkoxy or fluoroalkoxy;

K and K', independently of one another, denote hydrogen, fluorine, chlorine, cyano;

Z, Z', $Z^1$, $Z^{1'}$ independently of one another, denote a single covalent bond t denotes an integer from 1 to 4;

u denotes an integer from 1 to 3; and p, p', n, n' independently of one another, denote 0 or 1. The present invention also relates to the use of the above mentioned polymers as an orientation layer for liquid crystals and to their use in optical components.

13 Claims, No Drawings

PHOTOCROSSLINKABLE POLYMERS

This is a continuation of application Ser. No. 09/027,862, filed Feb. 23, 1998, now abandoned which is incorporated herein by reference.

BACKGROUND OF THE INVENTION

1. Field of the Invention

The invention relates to novel crosslinkable, photoactive polymers and their use as orientation layers for liquid crystals and for the production of unstructured or structured optical elements and multilayer systems.

The orientation layer is particularly important in (electro-optical) liquid crystal devices. It serves for ensuring uniform and trouble-free orientation of the longitudinal axes of the molecules.

Uniaxially rubbed polymer orientation layers, such as, for example, polyimide, are usually used for orienting liquid crystal molecules in liquid crystal displays (LCDs). The direction of rubbing determines the orientation direction in this process. However, rubbing entails some serious disadvantages which may strongly influence the optical quality of liquid crystal displays. Thus, rubbing produces dust which may lead to optical defects in the display. At the same time, the polymer layer is electrostatically charged, which, for example in thin film transistor (TFT)-TN-LCDs, may result in the destruction of the thin film transistors underneath. For these reasons, the yield of optically satisfactory displays in LCD production has not been optimal to date.

A further disadvantage of rubbing is that it is not possible to produce structured orientation layers in a simple manner since the orientation direction cannot be varied locally during rubbing. Thus, mainly layers uniformly aligned over a large area can be produced by rubbing. However, structured orientation layers are of considerable interest in many areas of display technology and integrated optics. For example, the dependency of the angle of view of twisted nematic (TN) LCDs can thus be improved.

Orientation layers in which the orientation direction can be predetermined by exposure to polarized light have been known for some time. The problems inherent in rubbing can thus be overcome. In addition, it is possible to specify the orientation direction differently from region to region and hence to structure the orientation layer.

2. Description of the Prior Art

One possibility for the structured orientation of liquid crystals utilizes the isomerizability of certain dye molecules for inducing a preferred direction photochemically by exposure to polarized light of suitable wavelength. This is achieved, for example, by mixing a dye with an orientation polymer and then exposing said dye to polarized light. Such a guest/host system is described, for example, in U.S. Pat. No. 4,974,941. In this system, azobenzenes are mixed into polyimide orientation layers and then exposed to polarized light. Liquid crystals which are in contact with the surface of a layer exposed in this manner are oriented according to this preferred direction. This orientation process is reversible, i.e. the already established direction of orientation can be rotated again by further exposure of the layer to light having a second polarization direction. Since this reorientation process can be repeated as often as desired, orientation layers of this type are less suitable for use in LCDs.

A further possibility for producing highly resolved orientation patterns in liquid crystalline layers is described in Jpn. J. Appl. Phys. Vol. 31 (1992), 2155. In this process, the dimerization of polymer-bound photoreactive cinnamic acid groups, induced by exposure to linearly polarized light, is utilized for the structured orientation of liquid crystals. In contrast to the reversible orientation process described above, an anisotropic polymer network is established in the case of the photostructurable orientation layers described in Jpn. J. Appl. Phys. Vol. 31 (1992), 2155. These photo-oriented polymer networks can be used wherever structured or unstructured liquid crystal orientation layers are required. Apart from in LCDs, such orientation layers can also be used, for example, for the production of so-called hybrid layers, as exemplified in European Patent Applications EP-A-0 611 981, EP-A-0 689 084, EP-A-0 689 065 and EP-A-0 753 785. With these hybrid layers of photostructured orientation polymers and crosslinkable low molecular weight liquid crystals, it is possible to realize optical elements, such as, for example, nonabsorptive color filters, linear and circular polarizers, optical retardation layers, etc.

EP-A-611,786 describes cinnamic acid polymers which are suitable in principle for the production of such anisotropically crosslinked, photostructured orientation layers for liquid crystals. These crosslinkable cinnamic acid derivatives are in principle linked to the polymer main chain via the carboxyl function of the cinnamic acid (phenylacrylic acid) and a spacer. However, the photopolymers of this type which have been used to date have a number of serious disadvantages. Thus, for example, photochemical competing reactions adversely affect the orientability. In addition, the known cinnamic acid polymers have insufficient photochemical long-term stability. For example, prolonged exposure of a prefabricated orientation layer to UV light leads to the destruction of the orientation originally present. Multiple exposures in which an existing orientation layer having a predetermined recorded pattern is exposed again in order to orient the still unexposed parts in another direction can be carried out only if the previously exposed parts are covered by a mask. Otherwise, the already oriented parts of the layer may lose some or all of their structure as a result of photochemical secondary reactions.

A further disadvantage of the cinnamic acid polymers used to date is that there is no tilt angle in the case of the orientation surfaces comprising these materials, which surfaces are produced by simple exposure to polarized light. Particularly for use in LCDs, however, a tilt angle must also be provided by the orientation layer in addition to the orientation direction.

In the above-mentioned uniaxially rubbed polymer orientation layers, this tilt angle is already generated in the rubbing process on the polymer surface. If a liquid crystal is brought into contact with such a surface, the liquid crystal molecules are not parallel but inclined to the surface and the tilt angle is thus transmitted to the liquid crystal. The magnitude of the tilt angle is determined both by rubbing parameters, such as, for example, feed rate and pressure, and by the chemical structure of the polymer. For the production of liquid crystal displays, tilt angles between 1° and 15° are required, depending on the type. The larger tilt angles are required in particular for supertwisted nematic (STN) LCDs, in order to avoid the formation of so-called fingerprint textures. In TN and TFT-TN-LCDs, the direction of rotation and the tilting direction are defined by the tilt angle, with the result that "reverse twist" and "reverse tilt" phenomena are prevented. While reverse twist in the unswitched state results in regions with an incorrect direction of rotation, which is manifested visually in a mottled appearance of the display, reverse tilt is optically very troublesome, especially on switching the LCD by tilting the liquid crystals in different directions. Reverse twist can be prevented by doping the liquid crystal mixture with a chiral dopant of suitable direction of rotation. For suppressing reverse tilt, however, there is to date no alternative possibility to the use of orientation layers with a tilt angle.

SUMMARY OF THE INVENTION

It was therefore the object of the invention to produce photoreactive polymers which do not have the above disadvantages of the cinnamic acid polymers used to date, i.e. the lack of photochemical long-term stability and especially the lack of a tilt angle after exposure to polarized light, and are thus capable of producing stable, highly resolved orientation patterns.

Surprisingly, it has now been found that the polymers which are disclosed in EP-A-611 786 and are linked by a spacer to the carboxyl group (COO) or the carboxylamino group (—CONR—) of 3-arylacrylic acid derivatives as the photoreactive unit, it being possible for the arylacrylic acid derivatives to have 1–3 rings, lead to orientation layers having a substantial tilt angle if at least one ring is a phenylene radical which is substituted ortho or meta to one of the linkage points by at least one alkoxy or fluoroalkoxy group.

At the same time, the orientation layers are photochemically more stable and lead to excellent orientation of the liquid crystals, which manifests itself, for example, in very good contrast. Moreover, the exposure to linearly polarized light can generally be carried out in the advantageous longer-wavelength range or in advantageously shorter exposure times.

The present invention relates to polymers of the general formula I:

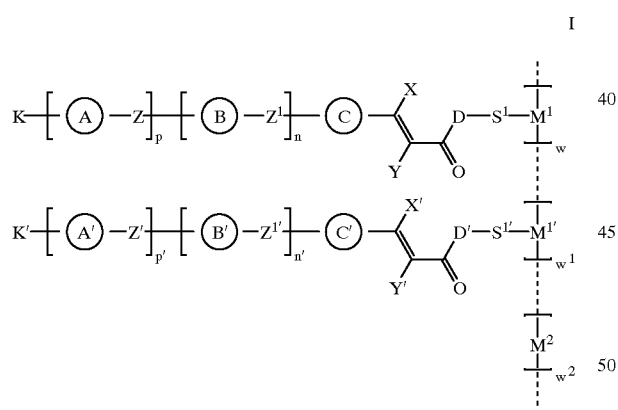

in which

M$^1$ and M$^{1'}$ denote a recurring monomer unit from the group:
acrylate, methacrylate, 2-chloroacrylate, 2-phenylacrylate; acrylamide, methacrylamide, 2-chloroacrylamide and 2-phenylacrylamide which are optionally N-substituted by lower alkyl; vinyl ethers, vinyl esters, styrene derivatives, siloxanes;

M$^2$ denotes a recurring monomer unit from the group:
acrylate, methacrylate, 2-chloroacrylate, 2-phenylacrylate, acrylamide, methacrylamide, 2-chloroacrylamide and 2-phenylacrylamide which are optionally N-substituted by lower alkyl; vinyl ethers, vinyl esters; straight-chain or branched alkyl esters of acrylic or methacrylic acid, allyl esters of acrylic or methacrylic acid, alkyl vinyl ethers or esters, phenoxyalkyl acrylates or phenoxyalkyl methacrylates or hydroxyalkyl acrylates or hydroxyalkyl methacrylates, phenylalkyl acrylates or phenylalkyl methacrylates, the alkyl radicals having 1 to 20, preferably 5 to 20, but in particular 5 to 18, carbon atoms; acrylonitrile, methacrylonitrile, styrene, 4-methylstyrene or siloxanes;

w, w$^1$ and w$^2$ are molar fractions of the comonomers with $0<w\leq1$, $0\leq w^1<1$ and $0\leq w^2\leq0.5$;

S$^1$ and S$^{1'}$, independently of one another, denote a spacer unit, such as a straight-chain or branched alkylene group —(CH$_2$)$_r$— which is optionally monosubstituted or polysubstituted by fluorine, chlorine or cyano, or a chain of the formula —(CH$_2$)$_r$—L—(CH$_2$)$_s$—, in which L denotes a single bond or linking functional groups, such as —O—, —COO—, —OOC—, —NR$^1$—, —NR$^1$—CO—, —CO—NR$^1$—, —NR$^1$—COO—, —OCO—NR$^1$—, —NR$^1$—CO—NR$^1$—, —CH=CH—, —C≡C—; in which R$^1$ denotes hydrogen or lower alkyl and r and s each represent an integer from 1 to 20, with the proviso that r+s is $\leq24$;

D, D', independently of one another, denote —O— or —NR$^2$—; in which R$^2$ denotes hydrogen or lower alkyl;

X, X', Y and Y', independently of one another, denote hydrogen, fluorine, chlorine, cyano, alkyl having 1 to 12 carbon atoms which is optionally substituted by fluorine and in which a CH$_2$ group or a plurality of non-neighboring CH$_2$ groups may optionally be replaced by O, —COO—, —OOC— and/or —CH=CH—;

A and A', independently of one another, denote phenylene, pyridine-2,5-diyl, pyrimidine-2,5-diyl, 1,3-dioxane-2,5-diyl, cyclohexane-1,4-diyl, piperidine-1,4-diyl or piperazine-1,4diyl which is unsubstituted or optionally substituted by fluorine, chlorine, cyano, alkyl, alkoxy or fluoroalkoxy;

B and B', independently of one another, denote phenylene, pyridine-2,5-diyl, pyrimidine-2,5-diyl, 1,4- or 2,6-naphthylene, 1,3-dioxane-2,5-diyl or cyclohexane-1,4-diyl which is unsubstituted or optionally substituted by fluorine, chlorine, cyano, alkyl, alkoxy or fluoroalkoxy;

C and C', independently of one another, denote phenylene which is unsubstituted or optionally substituted by fluorine, chlorine, cyano, alkyl, alkoxy or fluoroalkoxy, or pyrimidine-2,5-diyl, pyridine-2,5-diyl, 2,5-thiophenylene, 2,5-furanylene or 1,4- or 2,6-naphthylene;

K and K', independently of one another, denote hydrogen, fluorine, chlorine, cyano, nitro or a straight-chain or branched alkyl, alkoxy, alkyl-COO, alkyl-CO—NR$^3$ or alkyl-OCO group having 1 to 20 carbon atoms which is optionally substituted by fluorine, chlorine, cyano or nitro and in which one CH$_2$ group or a plurality of non-neighboring CH$_2$ groups may optionally be replaced by —O—, —CH=CH— or —C≡C— and in which R$^3$ denotes hydrogen or lower alkyl;

with the proviso that at least one of the rings A, B and C and/or at least one of the rings A', B' and C' represents a phenylene radical which is substituted by at least one alkoxy group or fluoroalkoxy group, and, if K denotes alkoxy or fluoroalkoxy, at least one of the rings A, B and C and/or at least one of the rings A', B' and C' represents a phenylene radical which is substituted by at least one further alkoxy group or fluoroalkoxy group;

Z, Z', $Z^1$ and $Z^{1'}$, independently of one another, denote a single covalent bond, $-(CH_2)_t-$, $-O-$, $-CO-$, $-CO-O-$, $-O-OC-$, $-NR^4-$, $-CO-NR^4-$, $-R^4N-CO-$, $-(CH_2)_u-O-$, $-O-(CH_2)_u-$, $-(CH_2)_u-NR^4-$ or $-NR^4-(CH_2)_u-$; in which $R^4$ denotes hydrogen or lower alkyl;

t denotes an integer from 1 to 4;

u denotes an integer from 1 to 3; and p, p', n and n', independently of one another, denote 0 or 1.

The present invention also relates to the use of the polymers according to the invention as an orientation layer for liquid crystals, and to their use in optical components, in particular for the production of hybrid layer elements.

DETAILED DESCRIPTION OF THE INVENTION

The polymers according to the invention can be used individually or in mixtures for the formation of orientation layers.

The polymer materials according to the invention are:

a) homopolymers having recurring structural units of the formula I, in which w is 1, $w^1$ is 0 and $w^2$ is 0.

b) copolymers having recurring structural units of the formula I, in which $0<w<1$, $0<w^1<1$, $w^2=0$.

c) copolymers having recurring structural units of the formula I, in which $0<w<1$, $w^1=0$, $0<w^2 \leq 0.5$.

The copolymers stated under c) are preferred.

The homopolymers stated under a) are particularly preferred.

The polymers according to the invention have a molecular weight $M_w$ between 1000 and 5,000,000, but preferably between 5000 and 2,000,000, but particularly advantageously between 10,000 and 1,000,000.

In the copolymers according to the invention and having recurring structural units of the formula I in which $w^1$ is 0, the proportion of copolymers units of the radical $M^2$ defined under formula I is less than or equal to 50%, preferably less than or equal to 30%, but in particular less than or equal to 15%.

The term "copolymers" is understood as meaning preferably random copolymers.

Recurring monomer units ($M^1$) and ($M^{1'}$) are, for example, acrylates such as

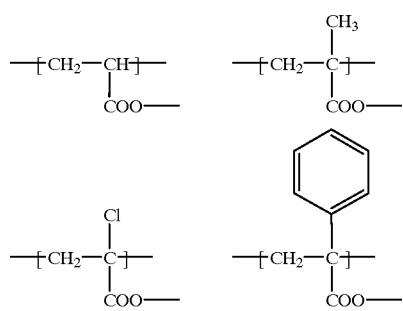

acrylamides, such as

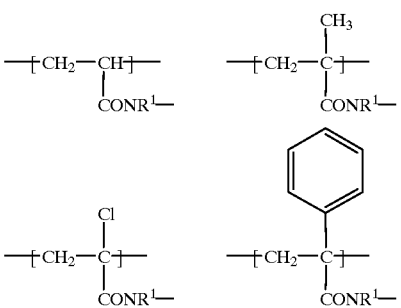

vinyl ethers and vinyl esters such as

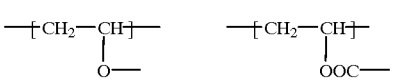

styrene derivatives such as

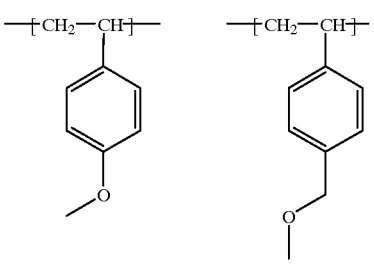

siloxanes such as

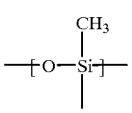

in which $R^1$ denotes hydrogen or lower alkyl.

Preferred "monomer units" $M^1$ are acrylate, methacrylate, 2-chloroacrylate, acrylamide, methacrylamide, 2-chloroacrylamide, styrene derivatives and siloxanes.

Particularly preferred "monomer units" $M^1$ are acrylate, methacrylate, styrene derivatives and siloxanes.

Very particularly preferred "monomer units" $M^1$ are acrylate, methacrylate and styrene derivatives.

Recurring monomer units ($M^2$) may likewise be the units mentioned under ($M^1$) and additionally units such as, for example, straight-chain or branched alkyl esters, phenylalkyl esters, phenoxyalkyl esters, hydroxyalkyl esters or allyl esters of acrylic or methacrylic acid, such as

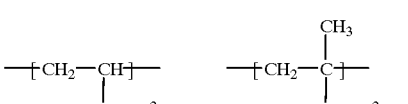

in which $R^2$ denotes alkyl, allyl or alkyl substituted by phenyl, phenoxy or hydroxyl.

Alkyl vinyl ethers or alkyl vinyl esters

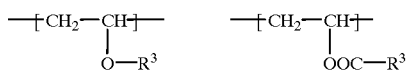

in which $R^3$ denotes alkyl.

The term "lower alkyl" alone or in combination, such as "lower alkoxy", "hydroxy-lower alkyl" or "phenoxy-lower alkyl", designates straight-chain and branched saturated hydrocarbon radicals having 1 to 6, preferably having 1 to 3, carbon atoms, such as methyl, ethyl, propyl or isopropyl and the like.

The term "alkyl" alone or in combination, such as "alkoxy", designates straight-chain or branched saturated hydrocarbon radicals having up to 20 carbon atoms.

The term "fluoroalkoxy" designates an alkoxy radical as defined above, in which the hydrocarbon radicals are mono- or polysubstituted by fluorine. Examples of fluoroalkoxy groups are: 1-fluoropropoxy, 1-fluoropentyloxy, 2-fluoropropoxy, 2,2-difluoropropoxy, 3-fluoropropoxy, 3,3-difluoropropoxy and 3,3,3-trifluoropropoxy.

In the context of the present invention, preferred "spacer units" are a straight-chain or branched alkylene group $—(CH_2)_r—$, as well as $—(CH_2)_r—O—(CH_2)_s—$, $—(CH_2)_r—COO—(CH_2)_s—$, $—(CH_2)_r—OOC—(CH_2)_s—$, $—(CH_2)_r—NR^1—CO—(CH_2)_s—$ or $—(CH_2)_r—NR^1COO—(CH_2)_s—$, in which $R^1$ denotes hydrogen or lower alkyl and r and s are each an integer from 1 to 20, but in particular 2 to 12, with the proviso that $r+s \leq 24$.

Examples of preferred "spacer units" are 1,4-butylene, 1,5-pentylene, 1,6-hexylene, 1,7-heptylene, 1,8-octylene, 1,9-nonylene, 1,10-decylene, 1,11-undecylene, 1,12-dodecylene, 1,3-butylene, 3-methyl-1,3-butylene, 3-propyleneoxy-6-hexylene, 3-propylenecarbamoyloxy-6-hexylene, 3-propylenecarbonyloxy-6-hexylene, 3-propyleneoxycarbonyl-6-hexylene, 3-propylenecarbonylamino-6-hexylene, propylenecarbamoylhexylene and the like.

Particularly preferred "spacer units" are a straight-chain alkylene group $—(CH_2)_r—$, as well as $—(CH_2)_r—O—(CH_2)_s—$, $—(CH_2)_r—NH—CO—(CH_2)_s—$ or $—(CH_2)_r—NH—COO—(CH_2)_s—$, in which r and s are each an integer from 2 to 12 and the sum r+s is $\leq 24$, in particular $\leq 15$.

The term "phenylene" includes 1,2-, 1,3- and 1,4-phenylene. 1,3- and 1,4-Phenylene are preferred, in particular 1,4-phenylene.

In the compounds of the formula I, it is essential that at least one phenylene radical is present which carries at least one alkoxy or fluoroalkoxy group. If the group K is an alkoxy group or fluoroalkoxy group, at least one further alkoxy or fluoroalkoxy substituent must be present and must be located either on the same phenylene radical as the radical K or on another phenylene radical contained in the compound of the formula I.

As explained above, copolymers having recurring structural units of the formula I in which $w^1$ is 0 are preferred and homopolymers having recurring structural units of the formula I in which $w^1$ is 0 and $w^2$ is 0 are particularly preferred. The preferred and particularly preferred compounds of the formula I can furthermore be divided into a) compounds of the formula I having three rings A, B and C
b) compounds of the formula I having two rings B and C
c) compounds of the formula I having one ring C.

Among these in turn, compounds of the formula I which have one ring or two rings are preferred. With regard to the crosslinkable group on the aromatic ring C, compounds of the formula I in which X and Y denote hydrogen and D denotes oxygen are preferred.

Thus, compounds of the formula I in which $M^1$, $M^2$, $S^1$ and K have the meaning stated under formula I and in which D denotes oxygen;
X and Y denote hydrogen;
w denotes 0<w<1;
$w^1$ denotes 0;
$w^2$ denotes $0<w^2<0.5$;
p denotes 0;
n denotes 0 or 1;
$Z^1$ denotes a single covalent bond, $—CH_2CH_2—$, $—O—$, $—CH_2—O—$, $—O—CH_2—$, $—CO—O—$ or $—O—OC—$;
C denotes phenylene, pyridine-2,5-diyl or pyrimidine-2,5-diyl which is unsubstituted or substituted by alkoxy or fluoroalkoxy; and
B denotes phenylene, pyridine-2,5-diyl, pyrimidine-2,5-diyl, cyclohexane-1,4-diyl or dioxane-1,5-diyl which is unsubstituted or substituted by alkoxy or fluoroalkoxy; with the proviso that at least one of the rings B and C represents a phenylene radical which is substituted by at least one alkoxy group or fluoroalkoxy group and, if K denotes alkoxy or fluoroalkoxy, at least one of the rings B and C represents a phenylene radical which is substituted by at least one further alkoxy group or fluoroalkoxy group.

Homopolymeric compounds of the formula I in which $M^1$, $S^1$, D, X, Y, K, $Z^1$, B and C have the above-mentioned meaning and in which p is 0, n is 0 or 1, w is 1 and $w^1$ and $w^2$ are 0 are also preferred.

Particularly preferred are compounds of the formula I in which $M^1$, $M^2$, $S^1$ and K have the meaning stated under formula I and in which D denotes oxygen;
X and Y denote hydrogen;
w denotes 0<w<1;
$w^1$ denotes 0;
$w^2$ denotes $0<w^2<0.5$;
p denotes 0;
n denotes 0 or 1;
B denotes phenylene which is unsubstituted or substituted by alkoxy or fluoroalkoxy, or cyclohexane-1,4-diyl; and
C denotes phenylene which is unsubstituted or substituted by alkoxy or fluoroalkoxy, with the proviso that one of the phenylene radicals present is substituted by at least one alkoxy group or fluoroalkoxy group and, if K denotes alkoxy or fluoroalkoxy, at least one of the phenylene radicals present is substituted by at least one further alkoxy group or fluoroalkoxy group.

Homopolymeric compounds of the formula I in which $M^1$, $S^1$, D, X, Y, K, B and C have the above-mentioned meaning and p is 0, n is 0 or 1, w is 1 and $w^1$ and $w^2$ are 0 are particularly preferred.

Polymers of the formula I are distinguished by the fact that they are easily obtainable. The preparation methods are known per se to the skilled worker.

The polymers of the formula I can in principle be prepared by two different processes. Apart from the direct polymerization of monomers prepared beforehand, it is possible to subject the reactive cinnamic acid derivatives to a polymer-analogous reaction with functional polymers.

For the direct polymerization, the monomers are first prepared from the individual components, i.e. the precursors of the compounds for the formula I, the spacers $S^1$ and the polymerizable moieties M. The formation of the polymers is then carried out in a manner known per se. The polymerization can be carried out, for example, in the melt or in solution in the absence of oxygen and in the presence of a free radical initiator which is capable of generating free radicals thermally, photochemically or by redox reaction. The reaction can be carried out in a temperature range from −10° C. to 120° C., preferably in a range from 20° C. to 100° C.

For the production of the orientation layers, the polymers according to the invention must first be applied to a carrier. Examples of known carrier materials are aluminum oxide, titanium dioxide, silicon dioxide (glass or quartz) or mixed oxides, such as, for example, indium tin oxide (ITO). In the applications according to the invention for optical or electro-optical devices, glass or optionally a carrier coated with an electrode (for example a glass sheet coated with indium tin oxide (ITO)) are particularly important as carrier materials. For the application, the polymers are applied to a carrier in a spin-coating apparatus so that homogeneous layers of 0.05–50 µm thickness are formed. The layers can be dimerized by exposure to linearly polarized light. By spatially selective irradiation of the molecular units of the formula I coupled to the carrier, very specific regions of a surface can now be oriented and at the same time also stabilized by the dimerization.

Thus, for the production of orientation layers in selected areas, the regions to be oriented can be exposed, for example, to a high-pressure mercury lamp, a xenon lamp or a pulsed UV laser with the use of a polarizer and optionally a mask for reproducing structures. The exposure time is dependent on the power of the individual lamps and may vary from a few seconds to one hour. However, the dimerization can also be effected by irradiation of the homogeneous layer with the use of filters which, for example, let through only the radiation suitable for the crosslinking reaction.

The polymers according to the invention are further illustrated by the Examples below. In the Examples below, g denotes the number of recurring units, so that polymers having a molecular weight $M_w$ between 1000 and 5,000,000, preferably between 5000 and 2,000,000, but particularly advantageously between 10,000 and 1,000,000, result; w, $w^1$ and $w^2$ denote molar fractions of the comonomers with $0<w\leq1$, $0\leq w^1<1$ and $0\leq w^2\leq0.5$.

EXAMPLE 1

Poly[1-[6-[3(E)-(3,4-dimethoxyphenyl)acryloyloxy]-hexyloxycarbonyl]-1-methylethylene]

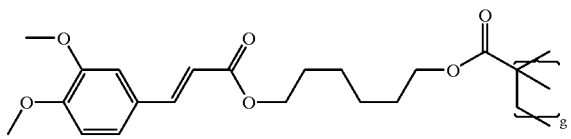

1.2 g (3.19 mmol) of 6-[3(E)-(3,4-dimethoxyphenyl)acryloyloxy]hexyl 2-methylacrylate and 5.2 mg (0.03 mmol) of 2,2'-azobisisobutyronitrile (AIBN) were dissolved in 5.2 ml of tetrahydrofuran (THF). The solution was flushed for 15 minutes with a gentle stream of argon. The reaction vessel was then closed air-tight and heated to 60° C. After 24 hours, air was passed into the vessel and the solution was diluted with 4 ml of THF and added dropwise to 800 ml of diethyl ether with vigorous stirring at room temperature. The precipitated polymer was filtered off and was dried at 60° C. under reduced pressure from a water-jet pump. For further purification, the polymer was dissolved in 10 ml of dichloromethane and again precipitated in 800 ml of diethyl ether. This procedure was repeated until no more monomer was detectable by thin-layer chromatography. Filtration and drying at 60° C. under reduced pressure gave 0.88 g of poly[1-[6-[3(E)-(3,4-dimethoxyphenyl)acryloyloxy]hexyloxycarbonyl]-1-methylethylene] as a white powder with an absorption maximum of $\lambda_{max.}$ (in $CH_2Cl_2$)=322 nm (A(1%)=475).

The 6-[3(E)-(3,4-dimethoxyphenyl)acryloyloxy]-hexyl 2-methacrylate used as starting material was prepared by the following process:

6-[3(E)-(3,4-Dimethoxyphenyl)acryloyloxy]hexyl 2-methacrylate

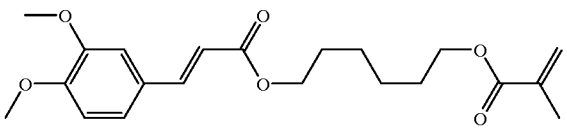

1.3 g (4.21 mmol) of 6-hydroxyhexyl 3(E)-(3,4-dimethoxyphenyl)acrylate were dissolved in 13 ml of tetrahydrofuran, and 1.0 ml (7.38 mmol) of triethylamine and 10 mg of 2,6-di-tert-butyl-p-cresol (BHT) were added in succession. A solution consisting of 0.61 ml (6.32 mmol) of methacryloyl chloride and 5 ml of tetrahydrofuran was added dropwise in the course of 15 minutes to the solution cooled to about 0° C. and was then allowed to react for 2 hours at 0° C. Thereafter, the reaction mixture was partitioned between diethyl ether and water and the organic phase was washed several times with saturated sodium chloride solution. The organic phase was then dried over magnesium sulfate, filtered and evaporated down. Chromatography of the residue over 100 g of silica gel with 1:1 cyclohexane/diethyl ether gave 1.2 g of 6-[3(E)-(3,4-dimethoxyphenyl) acryloyloxy]-hexyl 2-methacrylate.

6-Hydroxyhexyl 3(E)-(3,4-dimethoxyphenyl) acrylate

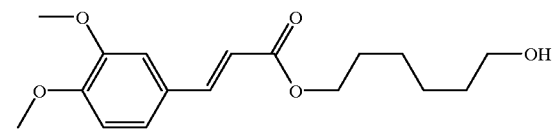

A solution consisting of 0.72 ml of 1,8-diazobicyclo [5.4.0]undec-7-ene (1.5–5) and 5 ml of dimethylformamide was added dropwise to a solution of 1.0 g of (E)-3,4-dimethoxycinnamic acid in 10 ml of dimethylformamide in the course of 10 minutes at room temperature. Thereafter, the reaction mixture was heated to 80° C., 0.18 g of tetrabutylammonium iodide and 0.71 ml of 6-chloro-1-hexanol were then added in succession and the reaction was then allowed to proceed for 19 hours. Thereafter, the reaction mixture was cooled to room temperature and partitioned between diethyl ether and 1 N hydrochloric acid and the organic phase was washed several times with saturated sodium chloride solution. The organic phase was then dried over magnesium sulfate, filtered and evaporated down. Chromatography of the residue over 150 g of silica gel with 3:2 toluene/ethyl acetate gave 1.35 g of 6-hydroxyhexyl 3(E)-(3,4-dimethoxyphenyl)acrylate.

The following polymers can be synthesized in an analogous manner:

cf. formula I with $p=0$, $n=0$, $X=H$, $Y=H$, $D=O$, $w=1$, $w^1=0$ and $w^2=0$

| K | C | $S^1$ | $M^1$ | $\gamma_{max.}$ $(CH_2Cl_2)$ |
|---|---|---|---|---|
| n-$C_8H_{17}O$ | (methoxy-methyl cinnamate structure) | $(CH_2)_6$ | (methacrylate structure)$_g$ | |
| $CF_3CH_2O$ | (methoxy-methyl cinnamate structure) | $(CH_2)_6$ | (methacrylate structure)$_g$ | |
| $CH_3O$ | (methoxy-methyl cinnamate structure) | $(CH_2)_8$ | (methacrylate structure)$_g$ | |
| n-$C_8H_{17}O$ | (methoxy-methyl cinnamate structure) | $(CH_2)_{11}$ | (methacrylate structure)$_g$ | |
| $C_2H_5O$ | (methoxy-methyl cinnamate structure) | $(CH_2)_{11}$ | (methacrylate structure)$_g$ | |
| $CF_3CH_2O$ | (methoxy-methyl cinnamate structure) | $(CH_2)_{11}$ | (methacrylate structure)$_g$ | |
| $CH_3O$ | (methoxy-methyl cinnamate structure) | $(CH_2)_6$ | (methacrylate structure)$_g$ | |
| n-$C_3H_7CH_2O$ | (methoxy-methyl cinnamate structure) | $(CH_2)_{11}$ | (methacrylate structure)$_g$ | |

-continued

| K | C | S¹ | M¹ | $\gamma_{max.}$ (CH$_2$Cl$_2$) |
|---|---|---|---|---|
| NO$_2$ | (methoxy, methyl-substituted phenyl cinnamate methyl ester) | (CH$_2$)$_{11}$ | (methacrylate-type unit)$_g$ | |
| NO$_2$ | (methoxy, methyl-substituted phenyl cinnamate methyl ester) | (CH$_2$)$_6$ | (methacrylate-type unit)$_g$ | |
| CH$_3$O | (methoxy, methyl-substituted phenyl cinnamate methyl ester) | (CH$_2$)$_4$ | (methacrylate-type unit)$_g$ | |
| n-C$_6$H$_{13}$CO—NH | (methoxy, methyl-substituted phenyl cinnamate methyl ester) | (CH$_2$)$_6$ | (methacrylate-type unit)$_g$ | |
| n-C$_8$H$_{17}$O | (methoxy, methyl-substituted phenyl cinnamate methyl ester) | (CH$_2$)$_{11}$ | (methacrylate-type unit)$_g$ | |
| C$_2$H$_5$O | (methoxy, methyl-substituted phenyl cinnamate methyl ester) | (CH$_2$)$_{11}$ | (methacrylate-type unit)$_g$ | |
| CF$_3$CH$_2$O | (methoxy, methyl-substituted phenyl cinnamate methyl ester) | (CH$_2$)$_{12}$ | (methacrylate-type unit)$_g$ | |
| CH$_3$O | (methoxy, methyl-substituted phenyl cinnamate methyl ester) | (CH$_2$)$_{12}$ | (methacrylate-type unit)$_g$ | |
| C$_3$F$_7$CH$_2$O | (methoxy, methyl-substituted phenyl cinnamate methyl ester) | (CH$_2$)$_{11}$ | (methacrylate-type unit)$_g$ | |

-continued

| K | C | S¹ | M¹ | $\gamma_{max.}$ (CH$_2$Cl$_2$) |
|---|---|---|---|---|
| NO$_2$ | (2-methoxy-4-methylphenyl cinnamate methyl ester) | (CH$_2$)$_{11}$ | (methacrylate group) | |
| NO$_2$ | (2-methoxy-4-methylphenyl cinnamate methyl ester) | (CH$_2$)$_6$ | (methacrylate group) | |
| CH$_3$O | (2-methoxy-4-methylphenyl cinnamate methyl ester) | (CH$_2$)$_6$O—CO—N—(CH$_2$) | (methacrylate group) | |
| H | n-C$_4$H$_9$O (3-butoxy-4-methylphenyl cinnamate methyl ester) | (CH$_2$)$_{11}$ | (methacrylate group) | |
| H | n-C$_4$H$_9$O (3-butoxy-4-methylphenyl cinnamate methyl ester) | (CH$_2$)$_6$ | (methacrylate group) | 277 nm 350 nm |
| H | n-C$_4$H$_9$O (3-butoxy-4-methylphenyl cinnamate methyl ester) | (CH$_2$)$_6$O—CON(CH$_2$)$_2$ | (methacrylate group) | |
| CH$_3$O | n-C$_4$H$_9$O (3-butoxy-4-methylphenyl cinnamate methyl ester) | (CH$_2$)$_6$ | (methacrylate group) | |
| CH$_3$O | (3,5-dimethoxy-4-methylphenyl cinnamate methyl ester) | (CH$_2$)$_6$ | (methacrylate group) | |

-continued

| K | C | S¹ | M¹ | $\gamma_{max.}$ (CH$_2$Cl$_2$) |
|---|---|---|---|---|
| H | 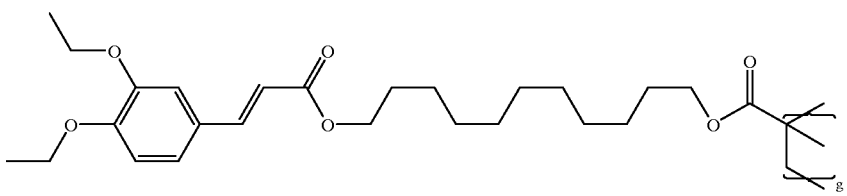 | (CH$_2$)$_{11}$ | | |

EXAMPLE 2

Poly [1-[11-[3(E)-(3,4-diethoxyphenyl)acryloyloxy]-undecyloxycarbonyl]-1-methylethylene]

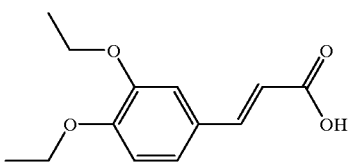

The preparation is carried out analogously to Example 1 from 1.0 g (2.14 mmol) of 11-[3(E)-(3,4-diethoxyphenyl)acryloyloxy]undecyl 2-methylacrylate and 3.5 mg (0.02 mmol) of 2,2'-azobisisobutyronitrile (AIBN) and gives poly [1-[11-[3(E)-(3,4-diethoxyphenyl)acryloyloxy] undecyloxycarbonyl]-1-methylethylene].

The 11-[3(E)-(3,4-diethoxyphenyl)acryloyloxy]-undecyl 2-methacrylate used as starting material was prepared by the following process:

Methyl 3(E)-(3,4-diethoxyphenyl)acrylate

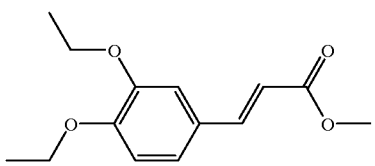

1.81 g (5.40 mmol) of methyl (triphenylphosphoranylidene)acrylate are added, at room temperature, to a solution of 1.0 g (5.15 mmol) of 3,4-diethoxybenzaldehyde and 10 ml of toluene. The reaction is then allowed to proceed for 1 hour at room temperature, the reaction suspension is clarified by filtration over a silica gel bed and the filtrate is evaporated down. Chromatography of the residue over silica gel using toluene/ethyl acetate gives methyl 3(E)-(3,4-diethoxyphenyl)acrylate.

3(E)-(3,4-Diethoxyphenyl)acrylic acid

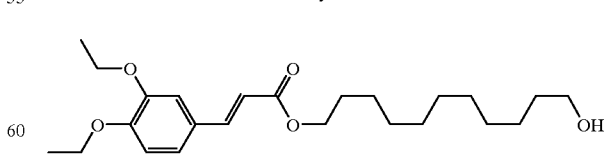

1.0 g (4.00 mmol) of methyl 3(E)-(3,4-diethoxyphenyl) acrylate is suspended in 30 ml of a 10% solution of potassium hydroxide in methanol. Thereafter, 2 ml of water are added and the mixture is heated to 70° C. for 3 hours. The reaction mixture is then cooled and is partitioned between diethyl ether and water, the organic phase is washed several times with saturated sodium chloride solution and the combined aqueous phases are adjusted to pH 4 with a 25% hydrochloric acid solution and are extracted several times with methylene chloride. The methylene chloride phases are combined, dried over magnesium sulfate, filtered and evaporated down. This gives 3(E)-(3,4-diethoxyphenyl)acrylic acid.

11-Hydroxyundecyl 3(E)-(3,4-diethoxyphenyl) acrylate

The preparation is carried out analogously to Example 1 from 0.94 g (4.00 mmol) of 3(E)-(3,4-diethoxyphenylacrylic acid and 1.10 g (4.40 mmol) of 11-bromo-1-undecanol and, after chromatography over silica gel using toluene/ethyl acetate, gives 11-hydroxyundecyl 3(E)-(3,4-diethoxyphenyl)acrylate.

11-[3(E)-(3,4-Diethoxyphenyl)acryloyloxy]undecyl 2-methacrylate

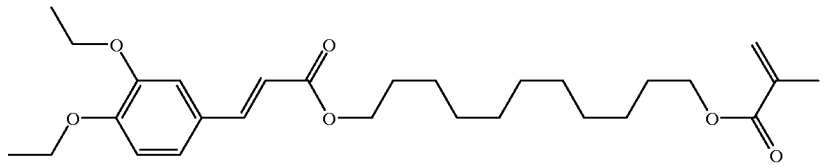

The preparation is carried out analogously to Example 1 from 1.56 g (4.00 mmol) of 11-hydroxyundecyl 3(E)-(3,4-diethoxyphenyl)acrylate, 0.42 ml (4.40 mmol) of methacryloyl chloride and 0.66 ml (4.80 mmol) of triethylamine and gives 11-[3(E)-(3,4-diethoxyphenyl)acryloyloxy]undecyl 2-methacrylate.

The following polymers can be synthesized in an analogous manner: cf. formula I with p=0, n=0 or 1, X=H, Y=H, D=O, w=1, w¹=0, w²=0.

| K | B | Z¹ | C | S¹ | M¹ | λmax. (CH₂Cl₂) |
|---|---|---|---|---|---|---|
| $C_2H_5O$ | | | [3-ethoxy-4-methylphenyl acrylate] | $(CH_2)_6$ | [methacrylate] | |
| $C_2H_5O$ | | | [3-ethoxy-4-methylphenyl acrylate] | $(CH_2)_4$ | [methacrylate] | |
| $C_2H_5O$ | | | [3-ethoxy-4-methylphenyl acrylate] | $(CH_2)_5$ | [methacrylate] | |
| $C_2H_5O$ | | | [3-ethoxy-4-methylphenyl acrylate] | $(CH_2)_7$ | [methacrylate] | |
| $C_2H_5O$ | | | [3-ethoxy-4-methylphenyl acrylate] | $(CH_2)_8$ | [methacrylate] | |

-continued

| K | B | Z¹ | C | S¹ | M¹ | λmax. (CH$_2$Cl$_2$) |
|---|---|---|---|---|---|---|
| C$_2$H$_5$O | | | (ethoxy-methyl-phenyl cinnamate methyl ester) | (CH$_2$)$_9$ | (methyl pivalate-like group with g) | |
| C$_2$H$_5$O | | | (ethoxy-methyl-phenyl cinnamate methyl ester) | (CH$_2$)$_{12}$ | (methyl pivalate-like group with g) | |
| C$_2$H$_5$O | | | (ethoxy-methyl-phenyl cinnamate methyl ester) | (CH$_2$)$_6$O— (CH$_2$)$_3$ | (methyl pivalate-like group with g) | |
| C$_2$H$_5$O | | | (ethoxy-methyl-phenyl cinnamate methyl ester) | (CH$_2$)$_6$O— CON(CH$_2$)$_3$ | (methyl pivalate-like group with g) | |
| C$_2$H$_5$O | | | (ethoxy-methyl-phenyl cinnamate methyl ester) | (CH$_2$)$_3$O— CO—(CH$_2$)$_3$ | (methyl pivalate-like group with g) | |
| C$_2$H$_5$O | | | (ethoxy-methyl-phenyl cinnamate methyl ester) | (CH$_2$)$_{11}$O— (CH$_2$)$_{11}$ | (methyl pivalate-like group with g) | |
| C$_2$H$_5$O | | | (diethoxy-methyl-phenyl cinnamate methyl ester) | (CH$_2$)$_{11}$ | (methyl pivalate-like group with g) | |
| C$_2$H$_5$O | | | (diethoxy-methyl-phenyl cinnamate methyl ester) | (CH$_2$)$_6$ | (methyl pivalate-like group with g) | |

-continued
| K | B | Z¹ | C | S¹ | M¹ | λmax. (CH₂Cl₂) |
|---|---|---|---|---|---|---|
| C₂H₅O | | | 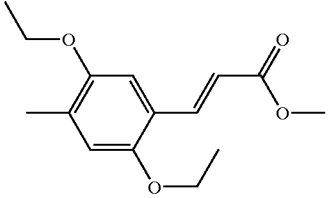 | (CH₂)₉ | 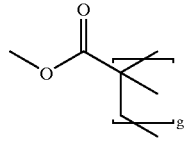 | |
| CH₃O | | | 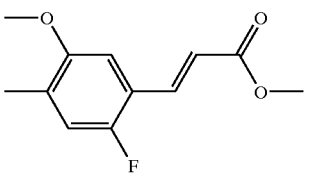 | (CH₂)₆ | 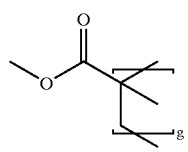 | |
| CH₃O | | | 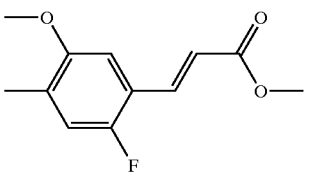 | (CH₂)₈ | 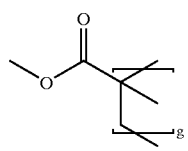 | |
| n-C₈H₁₇O | | | 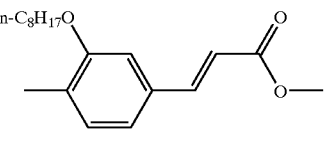 | (CH₂)₁₁ | 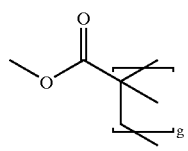 | |
| n-C₈H₁₇O | | | 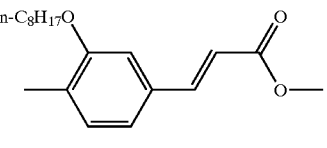 | (CH₂)₅ | 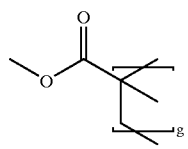 | |
| n-C₁₀H₂₁O | | | 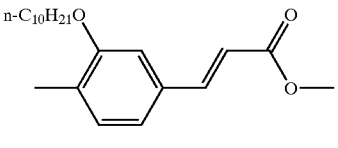 | (CH₂)₆ | 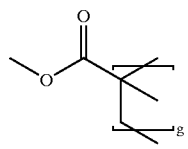 | |
| F | 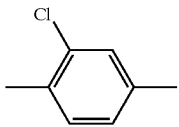 | N—CO | (attached cinnamate) | (CH₂)₄ | (methacrylate) | |
| F | (p-phenylene) | CH₂O | (attached cinnamate) | (CH₂)₇ | (methacrylate) | |

EXAMPLE 3

Poly[1-[8-[3(E)-(4-ethoxy-3-propoxyphenyl)acryloyloxy]-octyloxycarbonyl]-1-methylethylene]

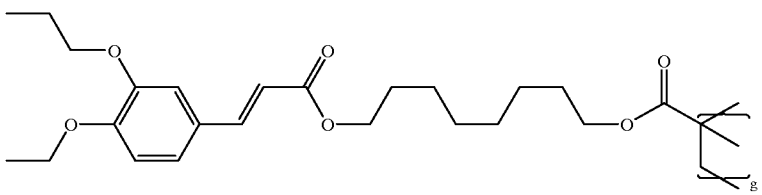

The preparation was carried out analogously to Example 1 from 1.0 g (2.24 mmol) of 8-{3(E)-[4-ethoxy-3-propoxyphenyl]acryloyloxy}octyl 2-methacrylate and 3.9 mg (0.02 mmol) of 2,2'-azobisisobutyronitrile (AIBN) and gives poly[1-[8-[3(E)-(4-ethoxy-3-propoxyphenyl)acryloyloxy]octyloxycarbonyl]-1-methylethylene].

The 8-[3(E)-[4-ethoxy-3-propoxyphenyl]-acryloyloxy] octyl 2-methacrylate used as starting material was prepared by the following process:

4-Benzyloxy-3-hydroxybenzaldehyde

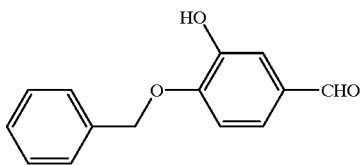

A mixture of 5.52 g (40 mmol) of 3,4-dihydroxybenzaldehyde, 6.09 g (44 mmol) of potassium carbonate, 70 mg of potassium iodide, 110 ml of acetone and 6.84 g (40 mmol) of benzyl bromide was refluxed for 15 hours. Thereafter, the mixture was cooled, the reaction suspension was filtered and the filtrate was evaporated down. Chromatography of the residue over silica gel using 9:1 toluene/ethyl acetate gave 3.6 g of 4-benzyloxy-3-hydroxybenzaldehyde.

4-Benzyloxy-3-propoxybenzaldehyde

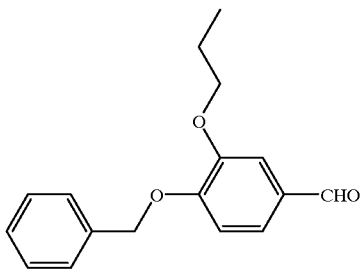

2.15 g (15.6 mmol) of potassium carbonate, 0.20 g (1.22 mmol) of potassium iodide and 1.20 ml (13.2 mmol) of n-propyl bromide were added to a solution of 2.73 g (12.0 mmol) of 4-benzyloxy-3-hydroxybenzaldehyde in 18 ml of dimethyl sulfoxide (DMSO) and were allowed to react for 24 hours at 60° C. Thereafter, the reaction mixture was cooled to room temperature and partitioned between ethylacetate and water and the organic phase was washed several times with saturated sodium chloride solution, dried over magnesium sulfate, filtered and evaporated down. Chromatography of the residue over 50 g of silica gel using toluene gave 2.90 g of 4-benzyloxy-3-propoxybenzaldehyde.

2-(4-Benzyloxy-3-propoxyphenyl)-5,5-dimethyl-1,3-dioxane

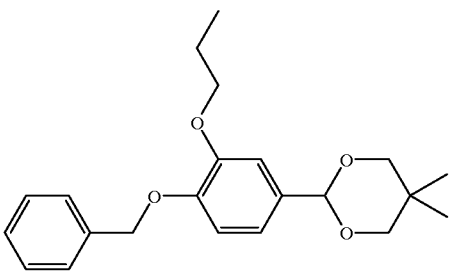

1.45 g (13.9 mmol) of neopentylglycol and 88 mg (0.46 mmol) of p-toluenesulfonic acid monohydrate were added to a solution of 1.25 g (4.63 mmol) of 4-benzyloxy-3-propoxybenzaldehyde in 50 ml of toluene and then refluxed for 1 hour under a water separator. Thereafter, the reaction mixture was cooled to room temperature and partitioned between toluene and a saturated sodium bicarbonate solution, and the organic phase was washed several times with water, dried over magnesium sulfate, filtered and evaporated down. Crystallization of the residue from 10 ml of diethyl ether gave 1.07 g of 2-(4-benzyloxy-3-propoxyphenyl)-5,5-dimethyl-1,3-dioxane.

4-(5,5-Dimethyl-1,3-dioxan-2-yl)-2-propoxyphenol

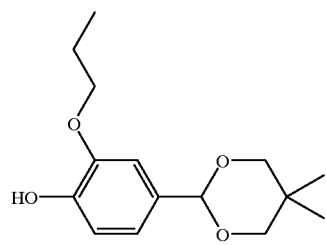

A mixture of 1.07 g (3.00 mmol) of 2-(4-benzyloxy-3-propoxyphenyl)-5,5-dimethyl-1,3-dioxane, 15 ml of tetrahydrofuran and 107 g of 10% palladium/C hydrogenation catalyst was hydrogenated at room temperature. After the absorption of 62.4 ml of hydrogen, the reaction suspension was filtered through Dicalite and evaporated down. Chromatography of the residue over 25 g of silica gel using 19:1 toluene/ethyl acetate gave 790 mg of 4-(5,5-dimethyl-1,3-dioxan-2-yl)-2-propoxyphenol.

4-Hydroxy-3-propoxybenzaldehyde

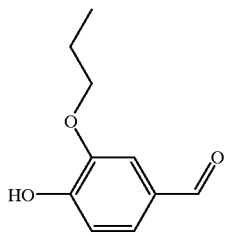

A mixture of 1.26 g (4.74 mmol) of 4-(5,5-dimethyl-1,3-dioxan-2-yl)-2-propoxyphenol, 20 ml of toluene and 20 ml of formic acid was vigorously stirred for 2 hours at room temperature. Thereafter, the reaction mixture was partitioned between toluene and water and the organic phase was washed several times with water, dried over magnesium sulfate, filtered and evaporated down. Crystallization of the residue from a mixture of 10 ml of diethyl ether and 20 ml of hexane gave 0.78 mg of 4-hydroxy-3-propoxybenzaldehyde.

Methyl 3(E)-[4-hydroxy-3-propoxyphenyl]acrylate

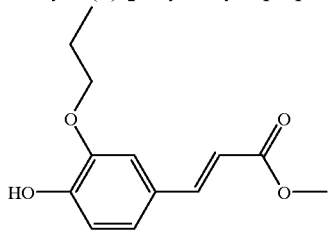

The preparation is carried out analogously to Example 2 from 0.76 g (4.22 mmol) of 4-hydroxy-3-propoxybenzaldehyde and 1.48 g (4.43 mmol) of methyl (triphenylphosphoranylidene)acrylate and gave 0.78 g of methyl (E)-4-hydroxy-3-propoxycinnamate.

Methyl 3(E)-[4-ethoxy-3-propoxyphenyl]acrylate

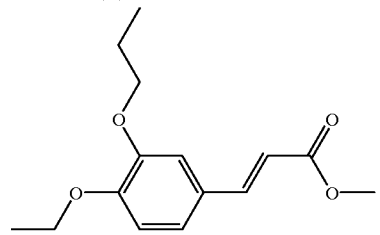

0.49 ml (6.60 mmol) of ethyl bromide and 1.37 g (9.9 mmol) of potassium carbonate are added to a mixture of 780 mg (3.30 mmol) of methyl (E)-4-hydroxy-3-propoxycinnamate and 10 ml of 2-butanone and then refluxed for 2 hours. Thereafter, the reaction mixture is cooled to room temperature and is partitioned between ethyl acetate and water, and the organic phase is washed several times with water, dried over magnesium sulfate, filtered and evaporated down. Chromatography of the residue over silica gel using 9:1 cyclohexane/ethyl acetate gives methyl 3(E)-[4-ethoxy-3-propoxyphenyl]acrylate.

3(E)-[4-Ethoxy-3-propoxyphenyl]acrylic acid

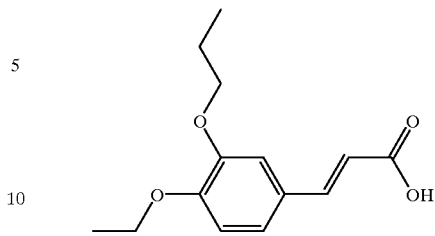

1.0 g (3.78 mmol) of methyl 3(E)-[4-ethoxy-3-propoxyphenyl]acrylate are suspended in 50 ml of a 10% solution of potassium hydroxide in methanol. 2 ml of water are then added and the mixture is heated to 70° C. for 3 hours and then cooled. Thereafter, the reaction mixture is partitioned between diethyl ether and water, the organic phase is washed several times with saturated sodium chloride solution and the combined aqueous phases are adjusted to pH 4 with a 25% hydrochloric acid solution and extracted several times with methylene chloride. The methylene chloride phases are then combined, dried over magnesium sulfate, filtered and evaporated down. This gives 3(E)-[4-ethoxy-3-propoxyphenyl]acrylic acid.

8-Hydroxyoctyl 3(E)-[4-ethoxy-3-propoxyphenyl]acrylate

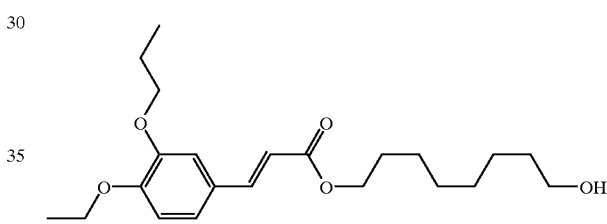

The preparation is carried out analogously to Example 1 from 1.0 g (4.00 mmol) of 3(E)-[4-ethoxy-3-propoxyphenyl]acrylic acid and 0.92 g (4.39 mmol) of 8-bromo-1-hexanol and, according to chromatography over 150 g of silica gel using toluene/ethyl acetate, gives 8-hydroxyoctyl 3(E)-[4-ethoxy-3-propoxyphenyl]acrylate.

8-[3(E)-(4-Ethoxy-3-propoxyphenyl)acryloyloxy]octyl 2-methacrylate

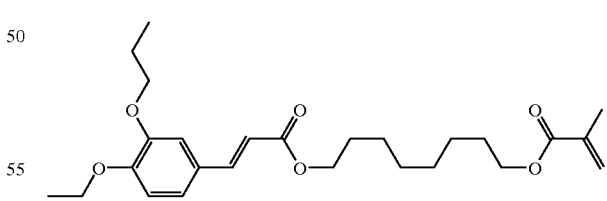

The preparation is carried out analogously to Example 1 from 1.0 g (2.64 mmol) of 8-hydroxyoctyl 3(E)-[4-ethoxy-3-propoxyphenyl]acrylate, 0.28 ml (2.90 mmol) of methacryloyl chloride and 0.48 ml (3.42 mmol) of triethylamine and gives 8-[3(E)-(4-ethoxy-3-propoxyphenyl)acryloyloxy]octyl 2-methacrylate.

The following polymers can be synthesized in an analogous manner: cf. formula I with p=0, n=0, X=H, Y=H, D=O, $w^1$=0 and $w^2$=0

| K | C | S¹ | M¹ | λmax. (CH₂Cl₂) |
|---|---|---|---|---|
| C₂H₅O | 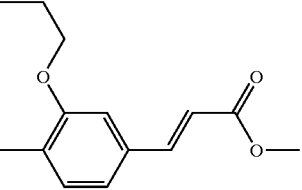 | (CH₂)₅ | 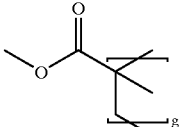 | |
| C₂H₅O | 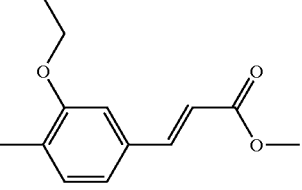 | (CH₂)₆ | 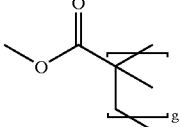 | |
| C₂H₅O | 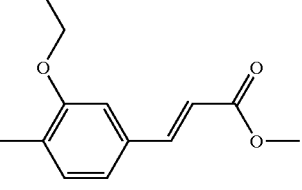 | (CH₂)₇ | 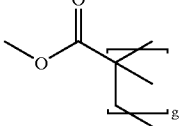 | |
| C₂H₅O | 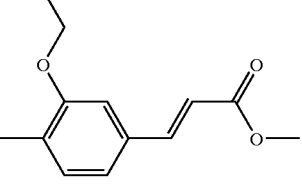 | (CH₂)₈ | 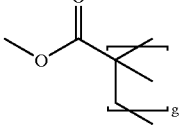 | |
| C₂H₅O | 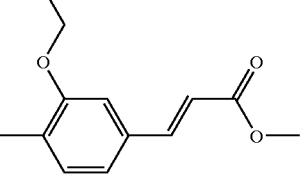 | (CH₂)₉ | 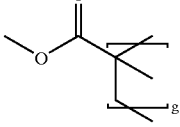 | |
| C₂H₅O | 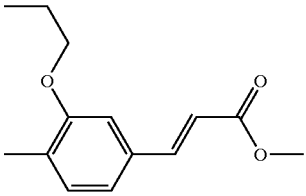 | (CH₂)₁₁ | 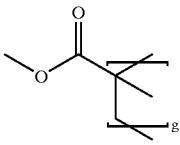 | |
| C₂H₅O | 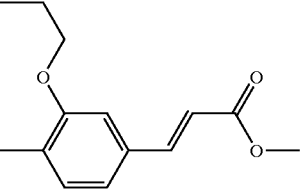 | (CH₂)₁₂ | 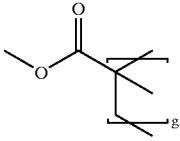 | |

-continued
| K | C | S¹ | M¹ | λmax. (CH₂Cl₂) |
|---|---|---|---|---|
| C₂H₅O | 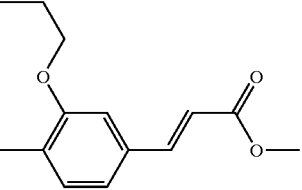 | (CH₂)₄ | 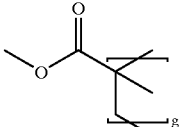 | |
| C₂H₅O | 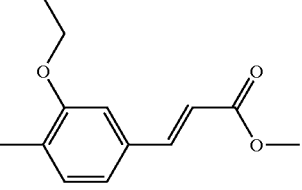 | (CH₂)₆O—CON(CH₂)₂ | 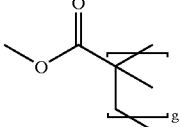 | |
| C₂H₅O | 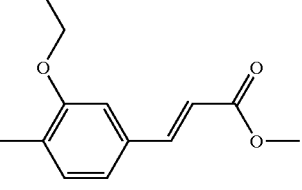 | (CH₂)₆O—(CH₂)₂ | 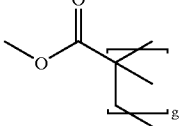 | |
| n-C₆H₁₃O | 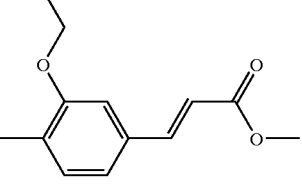 | (CH₂)₆ | 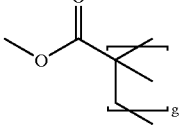 | |
| n-C₆H₁₃O | 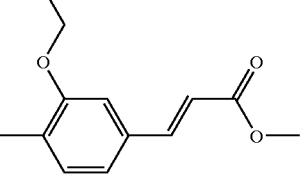 | (CH₂)₆O—(CH₂)₂ | 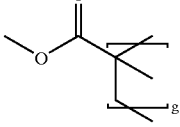 | |
| i-C₃H₇O | 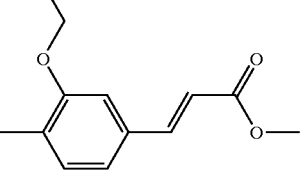 | (CH₂)₈ | 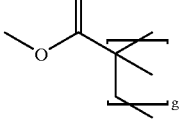 | |
| i-C₃H₇O | 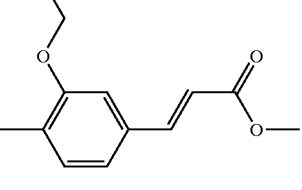 | (CH₂)₆ | 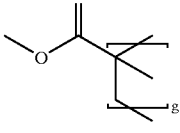 | |

-continued

| K | C | S¹ | M¹ | λmax. (CH₂Cl₂) |
|---|---|---|---|---|
| i-C₃H₇O | (cinnamate with propoxy, methyl on ring) | $(CH_2)_{11}$ | (methyl ester with branched group, g) | |
| n-C₃F₇(CH₂)O | (cinnamate with propoxy, methyl on ring) | $(CH_2)_8$ | (methyl ester with branched group, g) | |
| n-C₃F₇(CH₂)O | (cinnamate with propoxy, methyl on ring) | $(CH_2)_6$ | (methyl ester with branched group, g) | |
| n-C₃F₇(CH₂)O | (cinnamate with propoxy, methyl on ring) | $(CH_2)_{11}$ | (methyl ester with branched group, g) | |
| n-C₃H₇O | n-C₁₁H₂₃O (cinnamate, methyl on ring) | $(CH_2)_6$ | (methyl ester with branched group, g) | |
| CH₃O | n-C₁₁H₂₃O (cinnamate, methyl on ring) | $(CH_2)_{11}$ | (methyl ester with branched group, g) | |
| n-C₅H₁₁O | n-C₆H₁₃O (cinnamate, methyl on ring) | $(CH_2)_8$ | (methyl ester with branched group, g) | |
| n-C₅H₁₁O | i-C₄H₉O (cinnamate, methyl on ring) | $(CH_2)_{11}$ | (methyl ester with branched group, g) | |

-continued
| K | C | S¹ | M¹ | λmax. (CH₂Cl₂) |
|---|---|---|---|---|
| n-C₈H₁₇O | 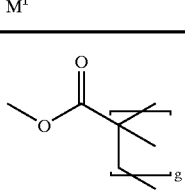 i-C₄H₉O | (CH₂)₁₁ | 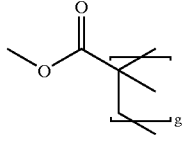 | |
| n-C₃H₇O | 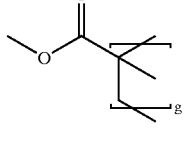 F₃C | (CH₂)₆ | 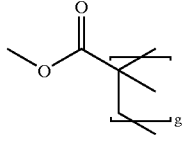 | |
| n-C₄H₉O | 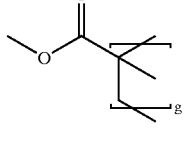 F₃C | (CH₂)₁₁ | 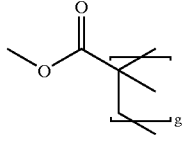 | |
| n-C₃F₇(CH₂)₂O | 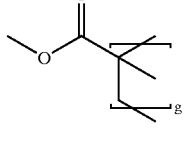 F₃C | (CH₂)₆ | 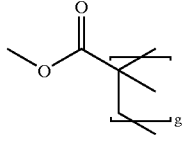 | |
| C₂H₅O | 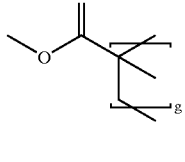 | (CH₂)₅ | 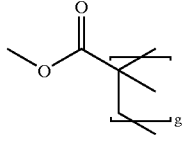 | |
| C₂H₅O | 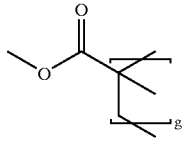 | (CH₂)₆ | 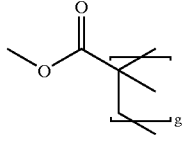 | |
| n-C₃H₇O | 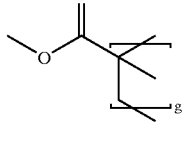 | (CH₂)₇ | 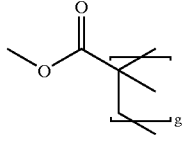 | |

-continued

| K | C | S¹ | M¹ | λmax. (CH$_2$Cl$_2$) |
|---|---|---|---|---|
| i-C$_3$H$_7$O | 2-propoxy-4-methyl cinnamate methyl ester | (CH$_2$)$_8$ | methyl pivalate-type group-g | |
| n-C$_{11}$H$_{23}$O | 2-propoxy-4-methyl cinnamate methyl ester | (CH$_2$)$_9$ | methyl pivalate-type group-g | |
| C$_2$H$_5$O | 2-(n-C$_6$H$_{13}$O)-4-methyl cinnamate methyl ester | (CH$_2$)$_{11}$ | methyl pivalate-type group-g | |
| C$_2$H$_5$O | 2-(n-C$_6$H$_{13}$O)-4-methyl cinnamate methyl ester | (CH$_2$)$_{12}$ | methyl pivalate-type group-g | |
| i-C$_4$H$_9$O | 2-(n-C$_6$H$_{13}$O)-4-methyl cinnamate methyl ester | (CH$_2$)$_6$ | methyl pivalate-type group-g | |
| C$_2$H$_5$O | 2-(n-C$_6$H$_{13}$O)-4-methyl cinnamate methyl ester | (CH$_2$)$_6$O—CON(CH$_2$)$_2$ | methyl pivalate-type group-g | |
| C$_2$H$_5$O | 2-(n-C$_6$H$_{13}$O)-4-methyl cinnamate methyl ester | (CH$_2$)$_6$O—(CH$_2$)$_2$ | methyl pivalate-type group-g | |
| t-C$_4$H$_9$O | 2-(n-C$_6$H$_{13}$O)-4-methyl cinnamate methyl ester | (CH$_2$)$_6$ | methyl pivalate-type group-g | |
| n-C$_6$H$_{13}$O | 2-(n-C$_4$H$_9$O)-4-methyl cinnamate methyl ester | (CH$_2$)$_4$ | methyl pivalate-type group-g | |

-continued
| K | C | S¹ | M¹ | λmax. (CH₂Cl₂) |
|---|---|---|---|---|
| n-C₁₁H₂₃O | 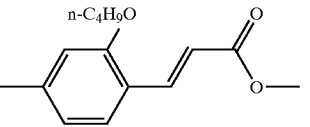 | (CH₂)₄ | 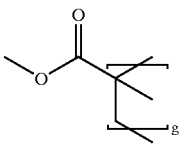 | |
| n-C₇H₁₅O | 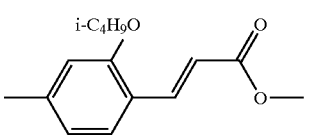 | (CH₂)₆ | 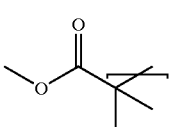 | |
| n-C₃F₇(CH₂)₂O | 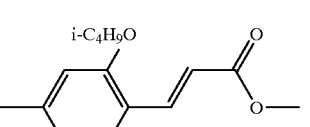 | (CH₂)₆ | 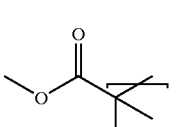 | |
| n-C₃F₇(CH₂)₂O | 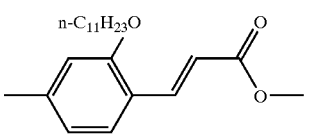 | (CH₂)₁₁ | 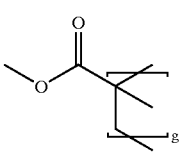 | |
| n-C₃F₇(CH₂)₂O | 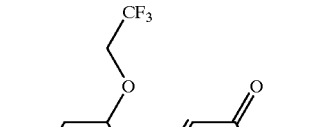 | (CH₂)₅ | 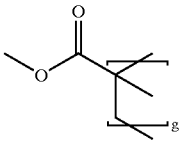 | |
| CH₃O | 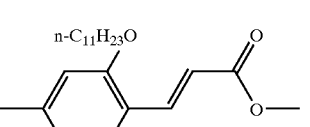 | (CH₂)₁₁ | 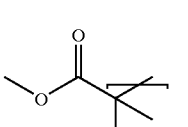 | |
| CH₃O | 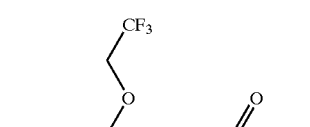 | (CH₂)₅ | 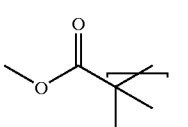 | |
| n-C₄H₉O | 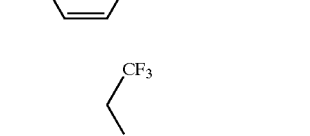 | (CH₂)₆ | 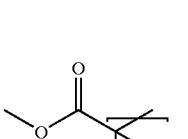 | |

| K | C | $S^1$ | $M^1$ | λmax. ($CH_2Cl_2$) |
|---|---|---|---|---|
| n-$C_{11}H_{23}$O | (structure with $CF_3$ ethoxy, methyl cinnamate) | $(CH_2)_{11}$ | (methacrylate) | |
| n-$C_5H_{11}$O | (structure with i-$C_4H_9$O, methyl cinnamate) | $(CH_2)_7$ | (methacrylate) | |
| n-$C_5H_{11}$O | (structure with n-$C_3H_7$ ethoxy, methyl cinnamate) | $(CH_2)_9$ | (methacrylate) | |
| $C_2H_5$O | (structure with n-$C_3H_7$ ethoxy, methyl cinnamate) | $(CH_2)_6$ | (methacrylate) | |

EXAMPLE 4

Poly {1-[6-[3-[3-Methoxy-4-(4-trans-pentylcyclohexylmethoxy)phenyl]acryloyloxy]hexyloxycarbonyl]-1-methylethylene}

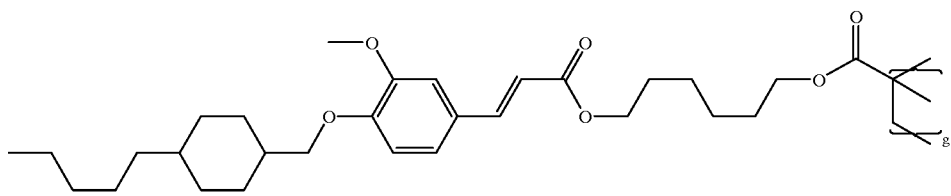

The preparation was carried out analogously to Example 1 from 1.9 g (1.89 mmol) of 6-{3(E)-[3-methoxy-4-(4-trans-pentylcyclohexylmethoxy)phenyl]acryloyloxy}hexyl 2-methacrylate and 3.1 mg (0.02 mmol) of 2,2'-azobisisobutyronitrile (AIBN) and gave 0.90 g of poly{1-[6-[3-[3-methoxy-4-(4-trans-pentylcyclohexylmethoxy)phenyl]acryloyloxy]hexyloxycarbonyl]-1-methylethylene}.

The 6-{3(E)-[3-methoxy-4-(4-trans-pentyl-cyclohexylmethoxy)phenyl]acryloyloxy}hexyl 2-methacrylate used as starting material was prepared by the following process:

Methyl 4-hydroxy-3(E)-methoxycinnamate

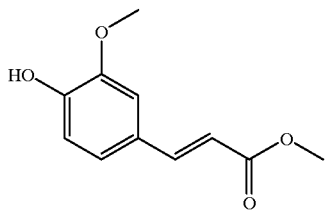

25 g (0.13 mol) of (E)-4-hydroxy-3-methoxycinnamic acid were dissolved in 180 ml of methanol and 5 ml of concentrated sulfuric acid was added. The solution was refluxed for 2 hours. Thereafter, the major part of the methanol (about 150 ml) was distilled off and the residue was poured onto 500 ml of ice water. The precipitated ester was filtered off with suction, washed in succession with cold water, with a little cold NaHCO₃ solution and again with cold water and dried at 50° C. under reduced pressure from a water-jet pump. Chromatography over 250 g of silica gel using dichloromethane/diethyl ether (19:1) gave 21.78 g of methyl (E)-4-hydroxy-3-methoxycinnamate as a pale yellow oil.

3.2 g (17.5 mmol) of (4-trans-pentylcyclohexyl)methanol and 4.0 g (19.2 mmol) of methyl 4-hydroxy-3-methoxycinnamate were dissolved in 90 ml of tetrahydrofuran. 4.6 ml (18.4 mmol) of tributylphosphine and then 4.6 g (18.4 mmol) of 1,1-(azo-dicarbonyl)dipiperidine were added in portions, at room temperature, to the clear solution obtained. The yellow suspension was then stirred for 15 hours at room temperature and then partitioned between diethyl ether and water, and the organic phase was washed several times with saturated sodium chloride solution, dried over magnesium sulfate, filtered and evaporated down. Chromatography of the residue over 200 g of silica gel using 3:1 toluene/ethyl acetate and recrystallization from a mixture of 40 ml of ethyl acetate and 80 ml of hexane gave 4.6 g of methyl 3(E)-[3-methoxy-4-(4-trans-pentylcyclohexylmethoxy)phenyl]acrylate.

3(E)-[3-Methoxy-4-(4-trans-pentylcyclohexylmethoxy)phenyl]acrylic acid

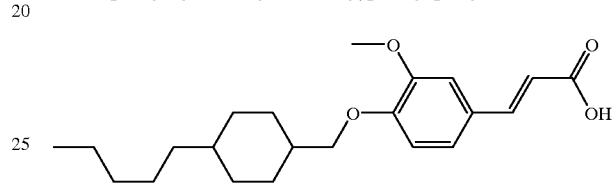

4.6 g (12.3 mmol) of methyl 3(E)-[3-methoxy-4-(4-trans-pentylcyclohexylmethoxy)phenyl]acrylate were suspended in 150 ml of a 10% solution of potassium hydroxide in methanol. 6 ml of water were then added and the mixture was heated to 70° C. for 3 hours. Thereafter, the reaction mixture was cooled and was partitioned between diethyl ether and water, and the organic phase was washed several times with sodium chloride solution and the combined aqueous phases were adjusted to pH 4 with a 25% hydrochloric acid solution and extracted several times with methylene chloride. The methylene chloride phases were combined, dried over magnesium sulfate, filtered and evaporated down. This gave 3.8 g of 3(E)-[3-methoxy-4-(4-trans-pentylcyclohexylmethoxy)phenyl]acrylic acid.

6-Hydroxyhexyl 3(E)-[3-methoxy-4-(4-trans-pentylcyclohexylmethoxy)phenyl]acrylate

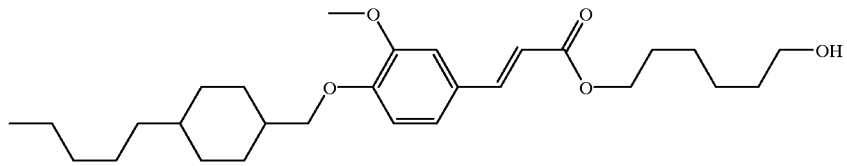

Methyl 3(E)-[3-methoxy-4-(4-trans-pentylcyclohexylmethoxy)phenyl]acrylate

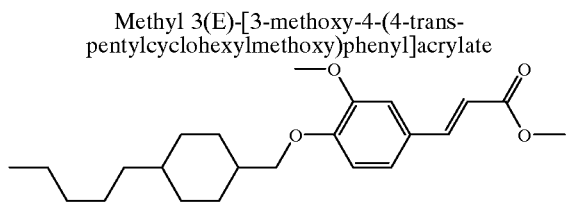

The preparation was carried out analogously to Example 1 from 1.95 g (5.41 mmol) of 3(E)-[3-methoxy-4-(4-trans-pentylcyclohexylmethoxy)phenyl]acrylic acid and 0.81 ml (6.11 mmol) of 6-chloro-1-hexanol and, according to chromatography over 150 g of silica gel using 3:1 toluene/ethyl acetate, gave 2.6 g of 6-hydroxyhexyl 3(E)-[3-methoxy-4-(4-trans-pentylcyclohexylmethoxy)phenyl]acrylate.

6-{3(E)-[3-Methoxy-4-(4-trans-pentylcyclohexylmethoxy)phenyl]acryloyloxy}hexyl 2-methacrylate

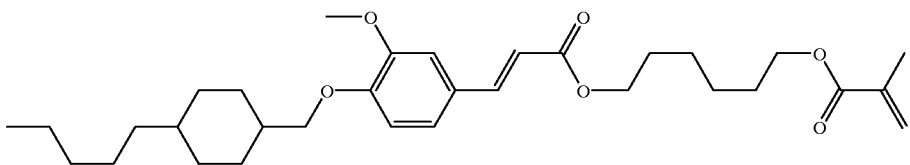

1.13 g (5.47 mmol) of dicyclohexylcarbodiimide were added, at 0° C., to a mixture of 1.80 g (4.69 mmol) of 6-hydroxyhexyl 3(E)-[3-methoxy-4-(4-trans-pentylcyclohexylmethoxy)phenyl]acrylate, 0.40 ml (4.69 mmol) of methacrylic acid and 67 mg (0.55 mmol) of 2,6-dimethylaminopyridine and were allowed to react for 15 hours at room temperature. The reaction mixture was then filtered through a silica gel bed and was evaporated down. Chromatography of the residue over 150 g of silica gel using 3:1 hexane/diethyl ether gave 1.9 g of 6-{3(E)-[3-methoxy-4-(4-trans-pentylcyclohexylmethoxy)phenyl]acryloyloxy}hexyl 2-methacrylate.

The following polymers can be synthesized in an analogous manner: cf. formula I with X=H, Y=H, D=O, w=1, $w^1$=0, $w^2$=0.

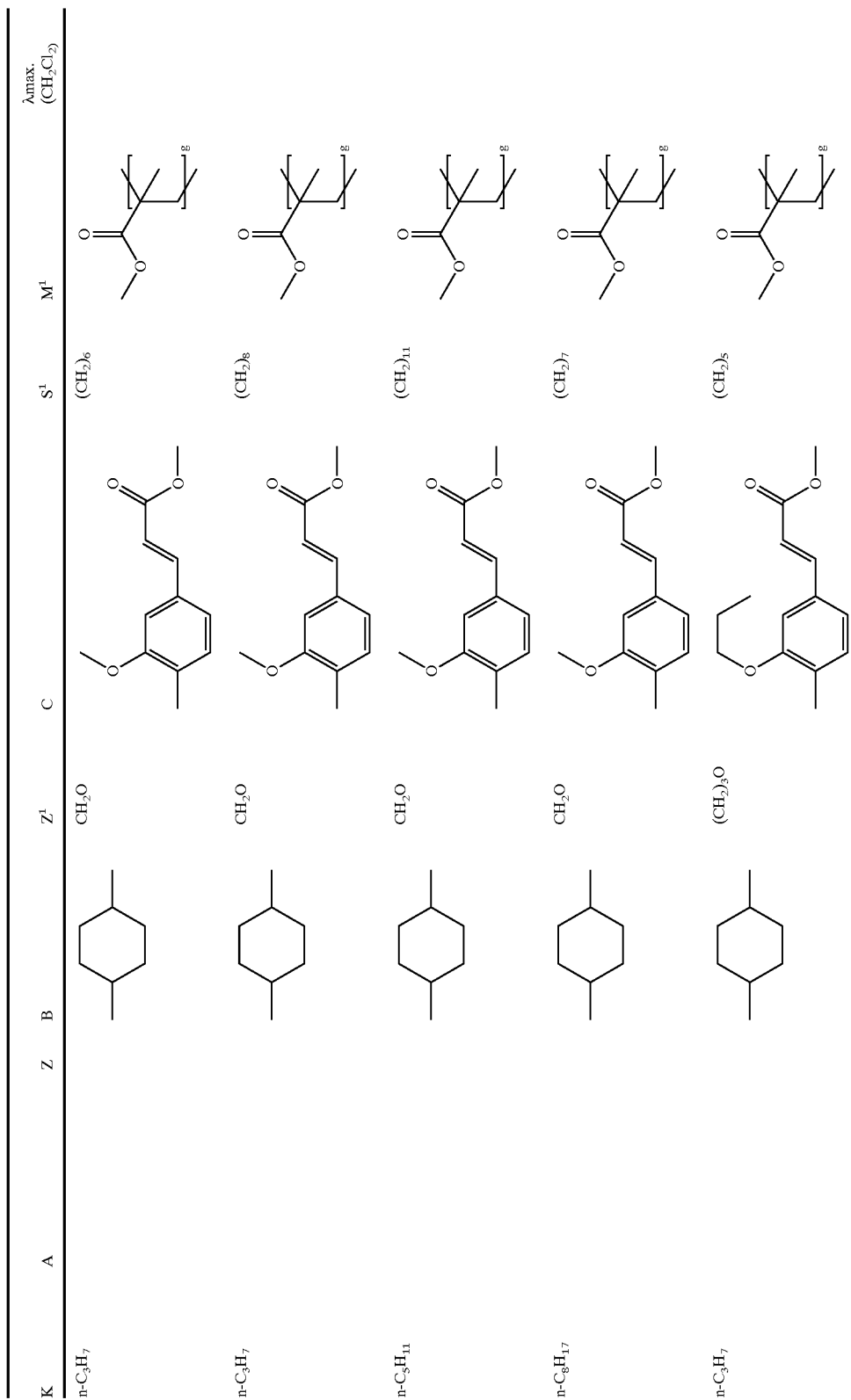

-continued
| K | A | Z | B | $Z^1$ | C | $S^1$ | $M^1$ | λmax. (CH$_2$Cl$_2$) |
|---|---|---|---|---|---|---|---|---|
| n-C$_3$H$_7$ | | |  | (CH$_2$)$_3$O |  | (CH$_2$)$_8$ |  | |
| n-C$_5$H$_{11}$ | | |  | (CH$_2$)$_3$O |  | (CH$_2$)$_{11}$ |  | |
| n-C$_8$H$_{17}$ | | | 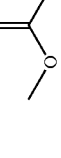 | (CH$_2$)$_3$O |  | (CH$_2$)$_6$ |  | |
| n-C$_3$H$_7$ | | |  | CH$_2$O |  | (CH$_2$)$_6$ |  | |
| n-C$_5$H$_{11}$ | | |  | CH$_2$O |  | (CH$_2$)$_{11}$ |  | |

-continued

| K | A | Z | B | $Z^1$ | C | $S^1$ | $M^1$ | λmax. (CH$_2$Cl$_2$) |
|---|---|---|---|---|---|---|---|---|
| n-C$_8$H$_{17}$ | | | tolyl | CH$_2$O | 2-ethoxy-4-methylcinnamate methyl ester | (CH$_2$)$_6$ | methacrylate | |
| n-C$_3$H$_7$ | | | tolyl | (CH$_2$)$_3$O | 2-ethoxy-4-methylcinnamate methyl ester | (CH$_2$)$_6$ | methacrylate | |
| n-C$_3$H$_7$ | | | tolyl | (CH$_2$)$_3$O | 3-ethoxy-4-methylcinnamate methyl ester | (CH$_2$)$_8$ | methacrylate | |
| n-C$_5$H$_{11}$ | | | tolyl | (CH$_2$)$_3$O | 3-ethoxy-4-methylcinnamate methyl ester | (CH$_2$)$_{11}$ | methacrylate | |
| n-C$_8$H$_{17}$ | | | tolyl | (CH$_2$)$_3$O | 3-ethoxy-4-methylcinnamate methyl ester | (CH$_2$)$_6$ | methacrylate | |

-continued
| K | A | Z | B | $Z^1$ | C | $S^1$ | $M^1$ | λmax. (CH$_2$Cl$_2$) |
|---|---|---|---|---|---|---|---|---|
| n-C$_3$H$_7$ | | | 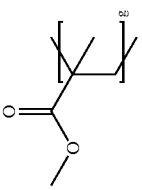 | COO | 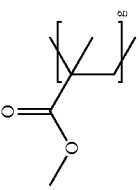 | (CH$_2$)$_6$ | 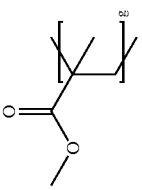 | |
| n-C$_3$H$_7$ | | | 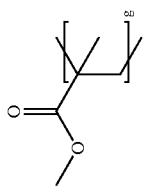 | COO | 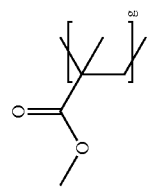 | (CH$_2$)$_8$ | 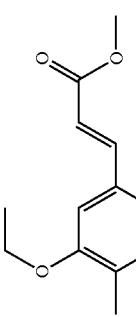 | |
| n-C$_5$H$_{11}$ | | | 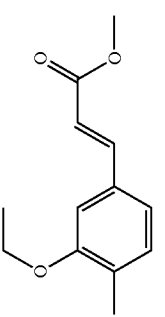 | COO | 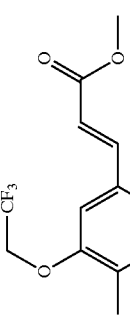 | (CH$_2$)$_{11}$ | 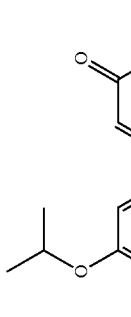 | |
| n-C$_8$H$_{17}$ | | | 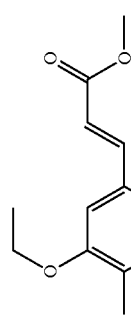 | COO | | (CH$_2$)$_6$ | | |
| n-C$_3$H$_7$ | | | | COO | | (CH$_2$)$_6$ | | |

-continued

| K | A | Z | B | Z¹ | C | S¹ | M¹ | λmax. (CH₂Cl₂) |
|---|---|---|---|---|---|---|---|---|
| n-C₃H₇ | phenylene | | phenylene | COO | 3-methoxy-4-methylphenyl cinnamate | (CH₂)₆ | methacrylate | |
| n-C₅H₁₁ | phenylene | | phenylene | CH₂O | 3-methoxy-4-methylphenyl cinnamate | (CH₂)₁₁ | methacrylate | |
| n-C₃H₇ | cyclohexyl | | phenylene | COO | 3-methoxy-4-methylphenyl cinnamate | (CH₂)₆ | methacrylate | |
| C₂H₅ | cyclohexyl | | 2,3-difluorophenylene | COO | 3-methoxy-4-methylphenyl cinnamate | (CH₂)₁₁ | methacrylate | |
| n-C₈H₁₇O | | | phenylene | COO | 3-ethoxy-4-methylphenyl cinnamate | (CH₂)₈ | methacrylate | |

-continued

| K | A | Z | B | $Z^1$ | C | $S^1$ | $M^1$ | λmax. ($CH_2Cl_2$) |
|---|---|---|---|---|---|---|---|---|
| $C_2H_5O$ | | | (2-methoxy-4-methylphenyl) | COO | (3-ethoxy-4-methylphenyl cinnamate methyl ester) | $(CH_2)_4$ | (methacrylate) | |
| F | | | (3-fluoro-4-methylphenyl) | COO | (3-ethoxy-4-methylphenyl cinnamate methyl ester) | $(CH_2)_6$ | (methacrylate) | |
| F | | | (3-fluoro-4-methylphenyl) | COO | (3-propoxy-4-methylphenyl cinnamate methyl ester) | $(CH_2)_6$ | (methacrylate) | |
| $n\text{-}C_3H_7$ | | | (2,3-difluoro-4-methylphenyl) | COO | (3-propoxy-4-methylphenyl cinnamate methyl ester) | $(CH_2)_{11}$ | (methacrylate) | |
| $n\text{-}C_5H_{11}$ | | | (4-methylphenyl) | COO | (3-propoxy-4-methylphenyl cinnamate methyl ester) | $(CH_2)_6$ | (methacrylate) | |

| K | A | Z | B | $Z^1$ | C | $S^1$ | $M^1$ | λmax. ($CH_2Cl_2$) |
|---|---|---|---|---|---|---|---|---|
| n-$C_3H_7$ | | | (cyclohexyl) | $CH_2O$ | (3-propoxy-4-methylphenyl methyl acrylate) | $(CH_2)_8$ | (methacrylate) | |
| n-$C_6H_{13}$ | | | (cyclohexyl) | $CH_2O$ | (2-n-$C_4H_9O$-4-methylphenyl methyl acrylate) | $(CH_2)_7$ | (methacrylate) | |
| $CH_3O$ | | | (phenyl) | COO | (2-$CF_3CH_2O$-4-methylphenyl methyl acrylate) | $(CH_2)_5$ | (methacrylate) | |
| n-$C_3H_7$ | | | (cyclohexyl) | $CH_2O$ | (2-$CF_3CH_2O$-4-methylphenyl methyl acrylate) | $(CH_2)_6$ | (methacrylate) | |

EXAMPLE 5

Poly{1-[6-[3(E)-(2-ethoxy-4'-methoxybiphenyl-4-yl)acryloyloxy]hexyloxycarbonyl]-1-methylethylene}

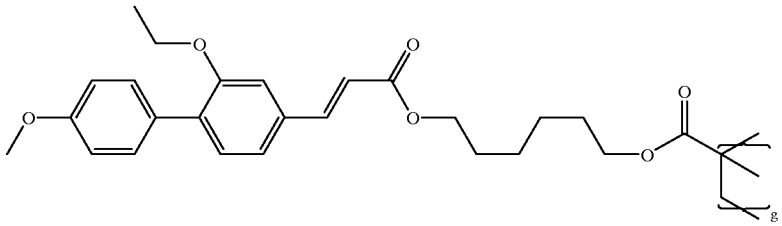

The preparation is carried out analogously to Example 1 from 1.0 g (2.14 mmol) of 6-{3(E)-[3-(2-ethoxy-4'-methoxybiphenyl-4-yl)acryloyloxy}hexyl 2-methylacrylate and 3.5 mg (0.02 mmol) of 2,2'-azobis-isobutyronitrile (AIBN) and gives poly{1-[6-[3(E)-(2-ethoxy-4'-methoxybiphenyl-4-yl)acryloyloxy]hexyloxycarbonyl]-1-methylethylene}.

The 6-{3(E)-[3-(2-ethoxy-4'-methoxybiphenyl-4-yl)acryloyloxy)hexyl 2-methacrylate used as starting material is prepared by the following process:

Methyl 3(E)-(3-ethoxy-4-hydroxyphenyl)acrylate

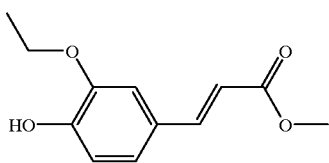

2.1 g (6.32 mmol) of methyl (triphenylphosphoranylidene)acrylate are added, at room temperature, to a solution of 1.0 g (6.01 mmol) of 3-ethoxy-4-hydroxybenzaldehyde and 10 ml of toluene. The reaction is then allowed to continue for 1 hour at room temperature, the reaction suspension is clarified by filtration over a silica gel bed and the filtrate is evaporated down. Chromatography of the residue over silica gel using toluene/ethyl acetate gives methyl 3(E)-(3-ethoxy-4-hydroxyphenyl)acrylate.

Methyl 3(E)-(3-ethoxy-4-trifluoromethanesulfonyloxyphenyl)acrylate

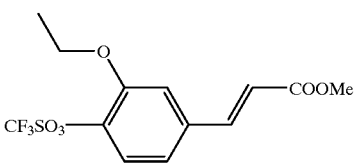

0.94 ml (6.75 mmol) of triethylamine is added to a solution consisting of 1.0 g (4.50 mmol) of methyl 3(E)-(3-ethoxy-4-hydroxyphenyl)acrylate and 10 ml of methylene chloride and the reaction mixture is then cooled to 0° C. At this temperature, a solution of 1.11 ml (6.75 mmol) of trifluoromethanesulfonic anhydride and 5 ml of methylene chloride is added dropwise in the course of 30 minutes. Thereafter, the reaction suspension is partitioned between methylene chloride and water and the organic phase is washed several times with saturated sodium chloride solution, dried over magnesium sulfate, filtered and evaporated down. Chromatography of the residue over silica gel gives methyl 3(E)-(3-ethoxy-4-trifluoromethanesulfonyloxyphenyl)acrylate.

Methyl 3(E)-(2-ethoxy-4'-methoxybiphenyl-4-yl)acrylate

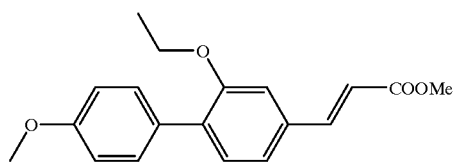

A mixture of 1.0 g (2.82 mmol) of methyl 3(E)-(3-ethoxy-4-trifluoromethanesulfonyloxyphenyl)acrylate, 0.47 g (3.10 mmol) of 4-methoxyphenylboric acid, 0.71 g (8.46 mmol) of sodium bicarbonate and 20 ml of dimethoxyethane is flushed three times with argon, 163 mg (0.14 mmol) of tetrakis (triphenylphosphine)palladium(0) are then added and the reaction is then allowed to continue for 15 hours at 80° C. Thereafter, the reaction mixture is cooled and is partitioned between ethyl acetate and water and the organic phase is washed with water and dried over magnesium sulfate, filtered and evaporated down. The residue is chromatographed over 100 g of silica gel using toluene/ethyl acetate (3:1). This gives methyl 3(E)-(2-ethoxy-4'-methoxybiphenyl-4-yl)acrylate.

3(E)-(2-Ethoxy-4'-methoxybiphenyl-4-yl)acrylic acid

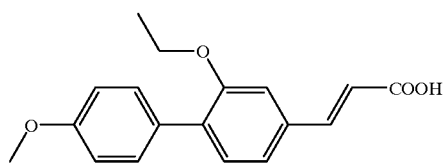

The preparation is carried out analogously to Example 2 from 1.0 g (3.2 mmol) of methyl 3(E)-(2-ethoxy-4'-methoxybiphenyl-4-yl)acrylate, 50 ml of a 10% solution of potassium hydroxide in methanol and 2 ml of water and gives 3(E)-(2-ethoxy-4'-methoxybiphenyl-4-yl)acrylic acid.

63

6-Hydroxyhexyl 3(E)-(2-ethoxy-4'-methoxybiphenyl-4-yl)acrylate

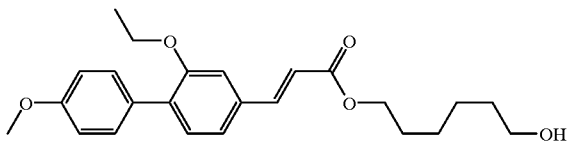

The preparation is carried out analogously to Example 2 from 1.0 g (3.35 mmol) of 3(E)-2-(2-ethoxy-4'-methoxybiphenyl-4-yl)acrylic acid, 0.49 g (3.68 mmol) of 6-chloro-1-hexanol and 0.55 g (3.68 mmol) of 1,8-diazabicyclo[5.4.0]undec-7-ene (1.5-5) and gives 6-hydroxyhexyl 3(E)-(2-ethoxy-4'-methoxybiphenyl-4-yl)acrylate.

64

6-[3(E)-(2-Ethoxy-4'-methoxybiphenyl-4-yl)acryloyloxy]-hexyl 2-methacrylate

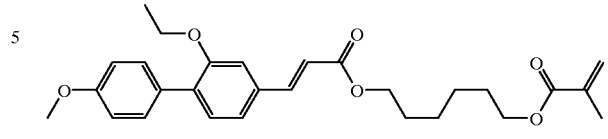

The preparation is carried out analogously to Example 1 from 1.0 g (2.14 mmol) of 6-hydroxyhexyl 3(E)-(2-ethoxy-4'-methoxybiphenyl-4-yl)acrylate, 0.31 ml (3.21 mmol) of methacryloyl chloride and 0.52 ml (3.75 mmol) of triethylamine and gives 6-[3(E)-(2-ethoxy-4'-methoxybiphenyl-4-yl)acryloyloxy)hexyl 2-methacrylate.

The following polymers can be synthesized in an analogous manner: cf. formula I with X=H, Y=H, D=O, w=1, $w^1$=0, $w^2$=0.

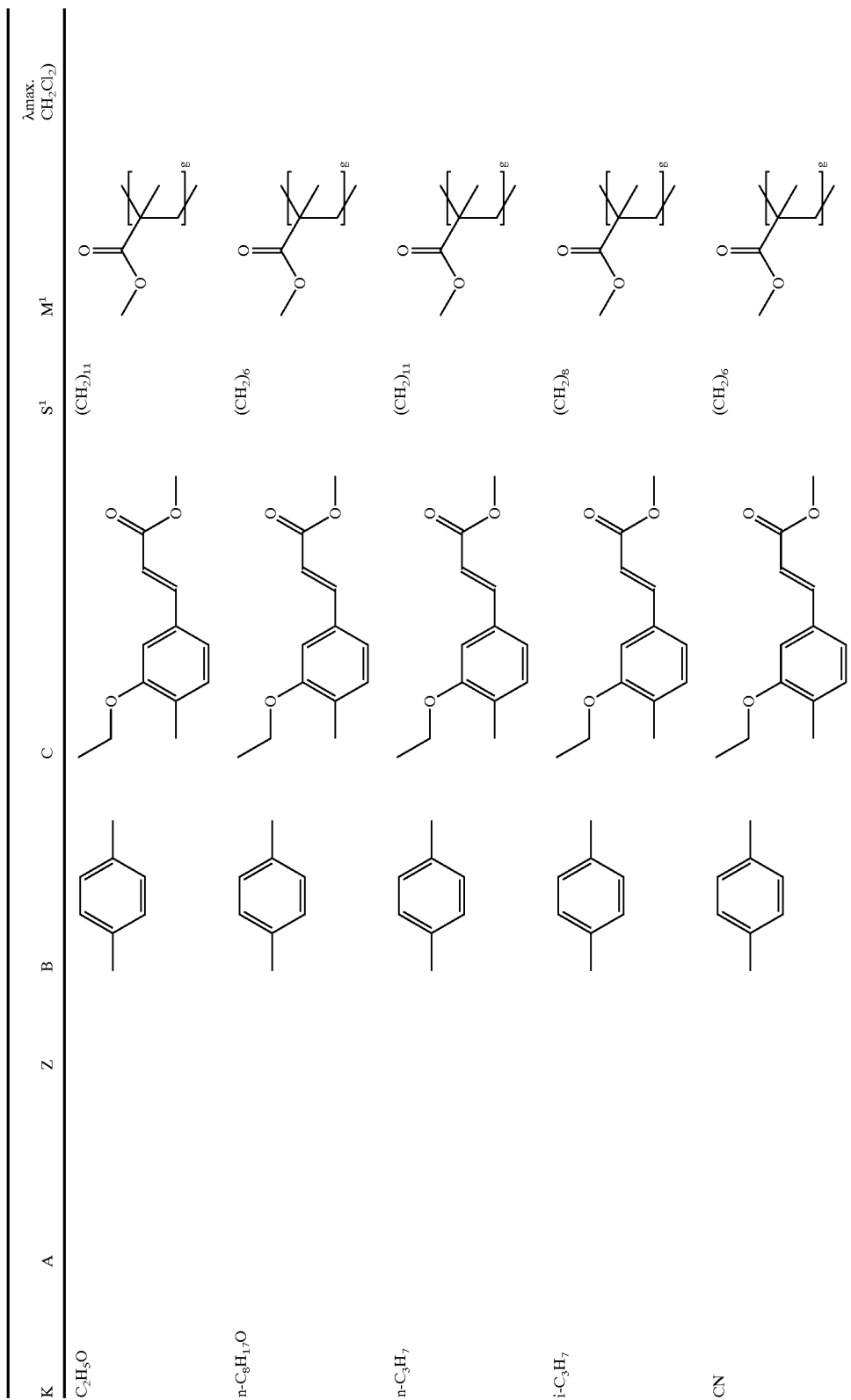

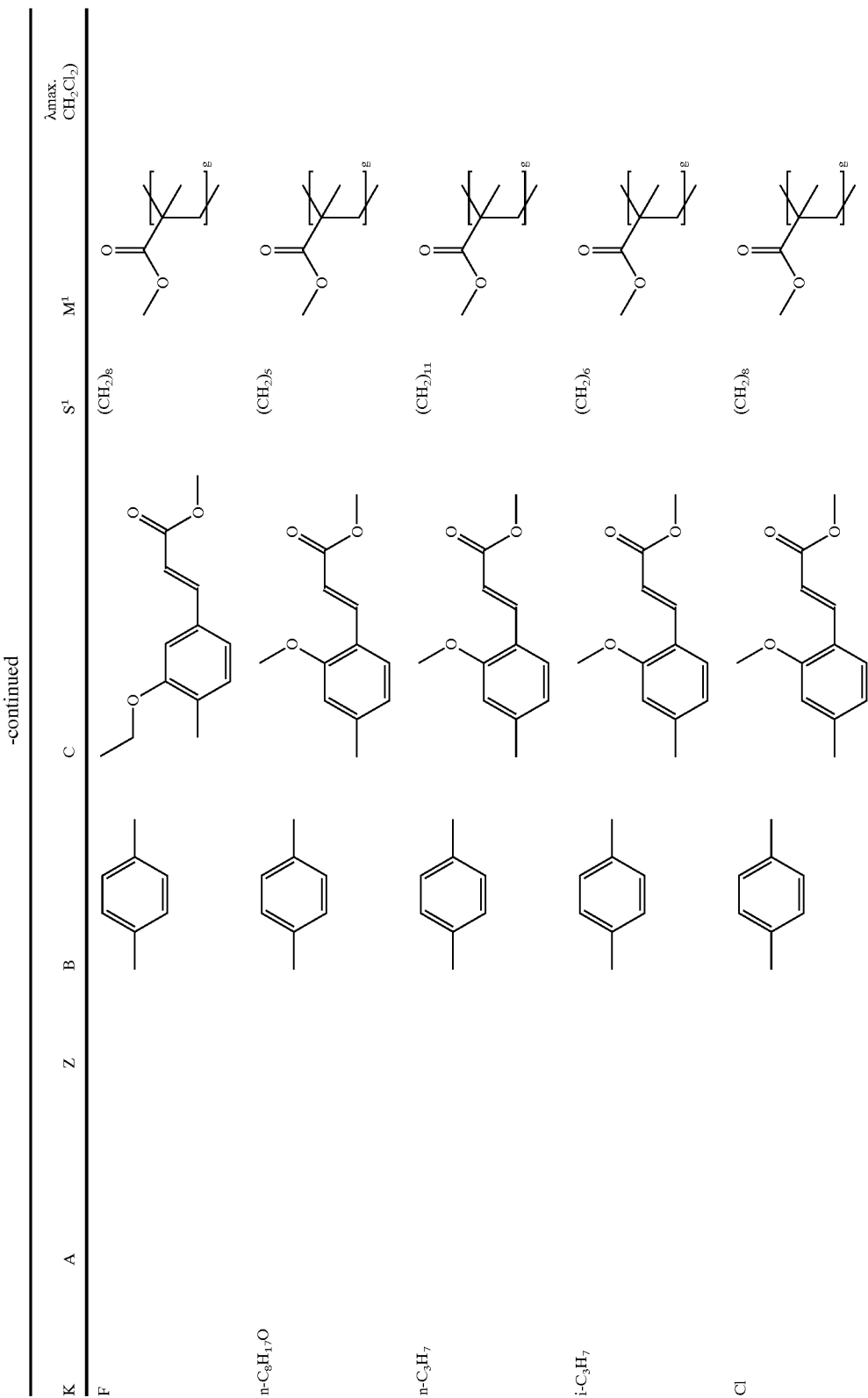

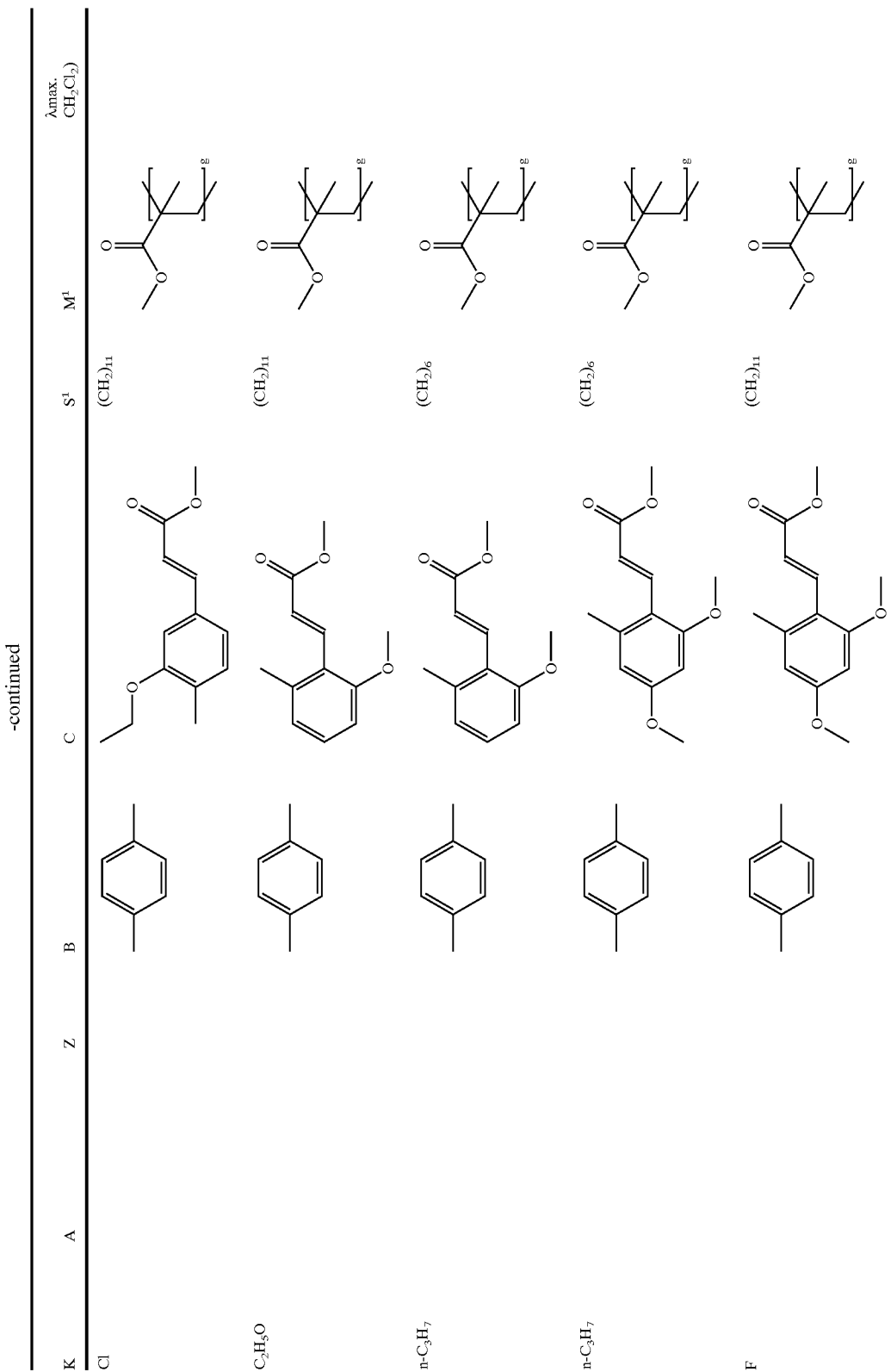

-continued

| K | A | Z | B | C | S¹ | M¹ | λmax. CH₂Cl₂ |
|---|---|---|---|---|---|---|---|
| CH₃O | | | *p-tolyl* | 2-methoxy-5-methyl cinnamate | (CH₂)₈ | methacrylate | |
| C₂H₅O | | | *p-tolyl* | 3-methoxy-4-methyl cinnamate | (CH₂)₆ | methacrylate | |
| n-C₈H₁₇O | | | *p-tolyl* | 3-methoxy-4-methyl cinnamate | (CH₂)₆ | methacrylate | |
| n-C₃H₇ | | | *p-tolyl* | 3-methoxy-4-methyl cinnamate | (CH₂)₁₁ | methacrylate | |
| i-C₃H₇ | | | *p-tolyl* | 3-methoxy-4-methyl cinnamate | (CH₂)₈ | methacrylate | |

| K | A | Z | B | C | S¹ | M¹ | λmax. CH₂Cl₂ |
|---|---|---|---|---|---|---|---|
| CN | | | (p-tolyl) | methyl (E)-3-methoxy-4-methylcinnamate | (CH₂)₆ | methacrylate | |
| F | | | (p-tolyl) | methyl (E)-3-methoxy-4-methylcinnamate | (CH₂)₈ | methacrylate | |
| Cl | | | 3-F-4-methylphenyl | methyl (E)-3-methoxy-4-methylcinnamate | (CH₂)₁₁ | methacrylate | |
| F | | | 3-F-4-methylphenyl | methyl (E)-3-methoxy-4-methylcinnamate | (CH₂)₆ | methacrylate | |
| H | | | 3,5-dimethylphenyl | methyl (E)-3-methoxy-4-methylcinnamate | (CH₂)₆ | methacrylate | |
| CH₃O | | | 2-methoxy-5-methylphenyl | methyl (E)-4-methylcinnamate | (CH₂)₅ | methacrylate | |

| K | A | Z | B | C | S¹ | M¹ | λmax. (CH₂Cl₂) |
|---|---|---|---|---|---|---|---|
| H | | | | | (CH₂)₁₁ | | |
| H | | | | | (CH₂)₆ | | |
| H | | | | | (CH₂)₁₁ | | |
| C₂H₅O | | | | | (CH₂)₁₁ | | |
| H | | | | | (CH₂)₆ | | |
| H | | | | | (CH₂)₆ | | |

-continued

| K | A | Z | B | C | S¹ | M¹ | λmax. CH₂Cl₂ |
|---|---|---|---|---|---|---|---|
| H | | | 3,5-bis(CF₃)-4-methylphenyl | methyl 3-methoxy-4-methylcinnamate | (CH₂)₆ | methacrylate | |
| H | | | 2-CF₃-4-methylphenyl | methyl 3-methoxy-4-methylcinnamate | (CH₂)₈ | methacrylate | |
| H | | | 4-methyl-2-methyl-5-ethoxyphenyl | methyl 3-methoxy-4-methylcinnamate | (CH₂)₆ | methacrylate | |
| H | | | 4-methyl-2-methyl-5-ethoxyphenyl | methyl 4-methylcinnamate | (CH₂)₆ | methacrylate | |
| H | | | 2-methoxy-5-methylphenyl | methyl 3-methoxy-4-methylcinnamate | (CH₂)₁₁ | methacrylate | |

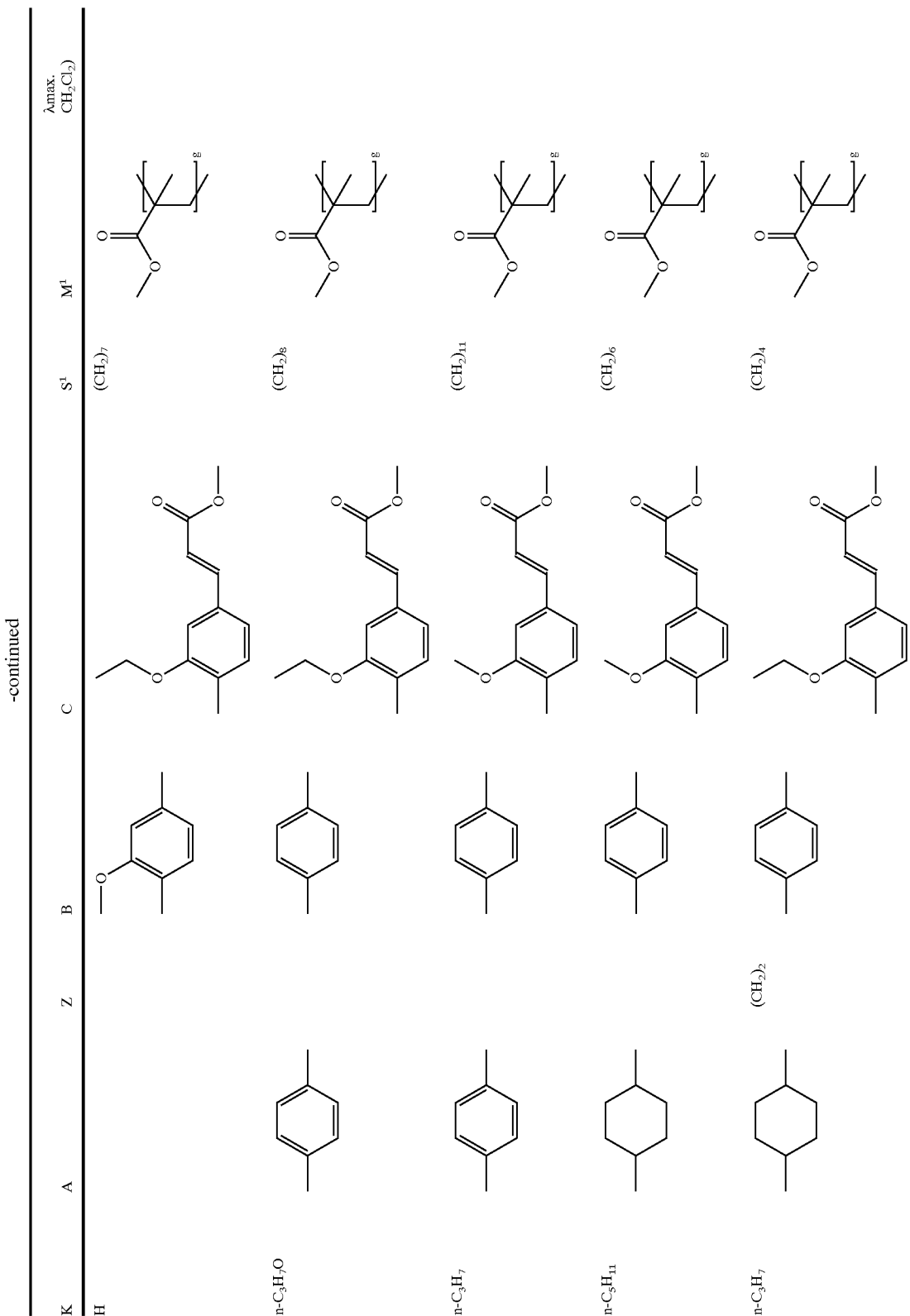

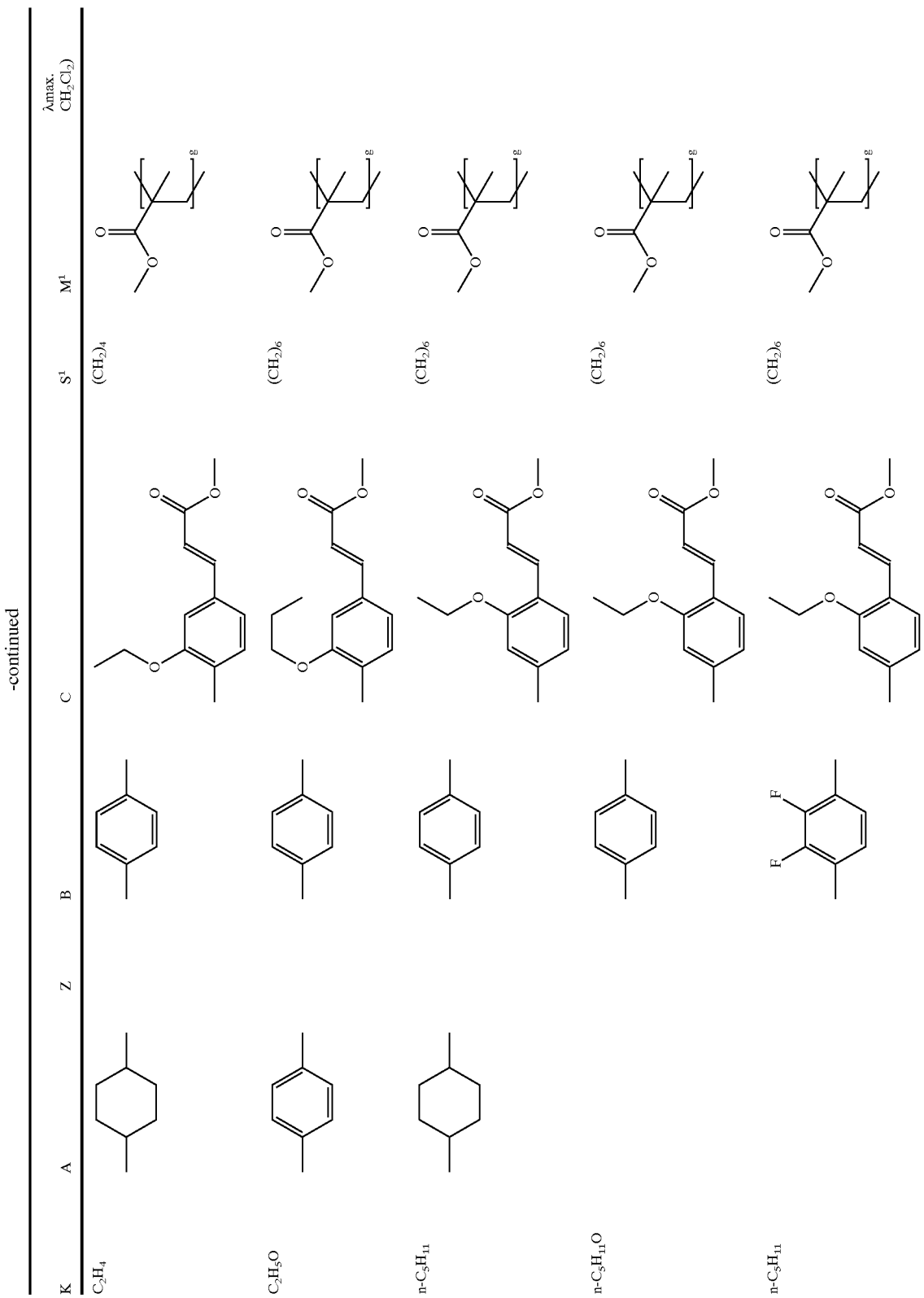

-continued
| K | A | Z | B | C | S¹ | M¹ | λmax. CH₂Cl₂ |
|---|---|---|---|---|---|---|---|
| n-C₃H₇ | | | 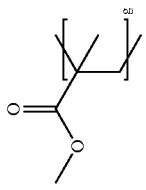 | 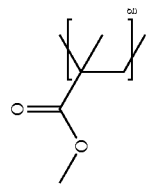 | (CH₂)₆ | 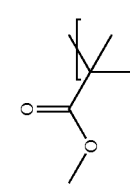 | |
| n-C₃H₇O | | | 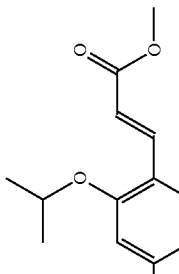 | 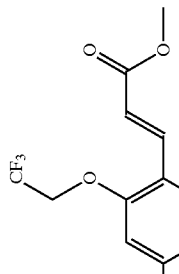 | (CH₂)₁₁ | 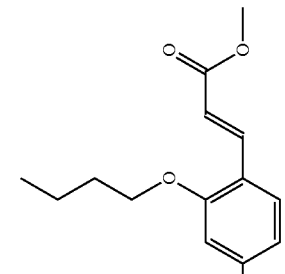 | |
| CF₃CH₂O | | | 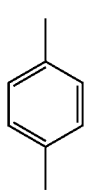 | 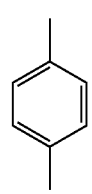 | (CH₂)₉ | 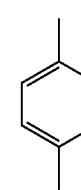 | |

EXAMPLE 6

Poly[1-[11-[3(E)-(3,4-dimethoxyphenyl)acryloyloxy]-undecyloxycarbonyl]-1-methylethylene] by polymer-analogous etherification according to Mitsunobu

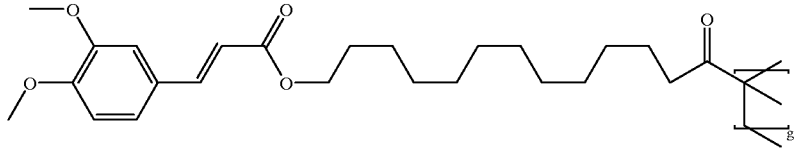

2.5 g (4.05 mmol) of a stock solution of poly(2-hydroxyethyl methacrylate) (21% by weight in DMA) are diluted with 7.5 ml of dimethylacetamide (DMA) under argon. 2.32 g (8.8 mmol) of triphenylphosphine and 3.62 g (8.1 mmol) of methyl 3-(4-hydroxyphenyl)acrylate are dissolved in the reaction batch while stirring at room temperature and the solution is cooled to 0° C. 1.4 ml (8.8 mmol) of diethyl azodicarboxylate (DEAD) are then added dropwise in the course of 4 hours. The reaction batch is left at 0° C. for a further 15 minutes and then, after removal of the ice bath, stirred for 15 hours at room temperature. The reaction mixture is then added dropwise to about 900 ml of diethyl ether with vigorous stirring, and the precipitated polymer is filtered off and is dried at 60° C. under reduced pressure from a water-jet pump. For purification, the residue is dissolved in 10 ml of dichloromethane and again precipitated in diethyl ether. This process is repeated until no more monomer is detectable by thin-layer chromatography. Filtration and drying at 60° C. under reduced pressure give poly[1-[11-[3(E)-(3,4-dimethoxyphenyl)acryloyloxy]undecyloxycarbonyl]-1-methylethylene].

The following polymers can be synthesized in an analogous manner:

poly [1-[4-[3 (E)-(3,4-dimethoxyphenyl)acryloyloxy]-butyloxycarbonyl]-1-methylethylene]

poly [1-[5-[3 (E)-(3,4-dimethoxyphenyl)acryloyloxy]-pentyloxycarbonyl]-1-methylethylene]

poly [1-[6-[3 (E)-(3,4-dimethoxyphenyl)acryloyloxyl]-hexyloxycarbonyl]-1-methylethylene]

poly [1-[7-[3 (E)-(3,4-dimethoxyphenyl)acryloyloxy]-heptyloxycarbonyl]-1-methylethylene]

poly [1-[8-[3 (E)-(3,4-dimethoxyphenyl)acryloyloxy]-octyloxycarbonyl]-1-methylethylene]

poly [1-[9-[3 (E)-(3,4-dimethoxyphenyl)acryloyloxy]-nonyloxycarbonyl]-1-methylethylene]

poly [1-[10-[3 (E)-(3,4-dimethoxyphenyl)acryloyloxy]-decyloxycarbonyl]-1-methylethylene]

poly [1-[11-[3 (E)-(2,5-dimethoxyphenyl)acryloytoxy]-undecyloxycarbonyl]-1-methylethylene]

poly [1-[12-[3 (E)-(3,4-dimethoxyphenyl)acryloyloxy]-dodecyloxycarbonyl]-1-methylethylene]

poly [1-[5-[3 (E)-(3,4-dimethoxyphenyl)acryloyloxy]-pentyloxycarbonyl]-1-methylethylene-co-1-[6-[3 (E)-(3,4-dimethoxyphenyl)acryloyloxy]hexyloxycarbonyl]-1-methylethylene]

poly [1-[7-[3 (E)-(3,4-dimethoxyphenyl)acryloyloxy]-heptyloxycarbonyl]-1-methylethylene-co-1-[8-[3 (E)-(3,4-dimethoxyphenyl)acryloyloxy]octyloxycarbonyl]-1-methylethylene]

poly [1-[9-[3 (E)-(3,4-diethoxyphenyl)acryloyloxy]-nonyloxycarbonyl]-1-methylethylene-co-1-[6-[3 (E)-(3,4-dimethoxyphenyl)acryloyloxy]hexyloxycarbonyl]-1-methylethylene]

poly [1-[10-[3 (E)-(3,4-diethoxyphenyl)acryloyloxy]-decyloxycarbonyl]-1-methylethylene-co-1-[6-[3 (E)-(3,4-dimethoxyphenyl)acryloyloxy]hexyloxycarbonyl]-1-methylethylene]

poly [1-[11-[3 (E)-(3,4-diethoxyphenyl)acryloyloxy]-undecyloxycarbonyl]-1-methylethylene-co-1-[7-[3 (E)-(3,4-dimethoxyphenyl)acryloyloxy]heptyloxycarbonyl]-1-methylethylene]

poly [1-[8-[3 (E)-(4-ethoxy-3-propoxyphenyl)acryloyloxy]-octyloxycarbonyl]-1-methylethylene]

poly [1-[9-[3 (E)-(4-ethoxy-3-propoxyphenyl)acryloyloxy]-nonyloxycarbonyl]-1-methylethylene]

poly [1-[11-[3 (E)-(4-ethoxy-3-propoxyphenyl)acryloyloxy]-undecyloxycarbonyl]-1-methylethylene]

poly [1-[8-[3 (E)-(4-ethoxy-3-propoxyphenyl)acryloyloxy]-octyloxycarbonyl]-1-methylethylene-co-1-[8-[3 (E)-(3,4-dimethoxyphenyl)acryloyloxy]octyloxycarbonyl]-1-methylethylene]

poly [1-[9-[3 (E)-(4-ethoxy-3-propoxyphenyl)acryloyloxy]-nonyloxycarbonyl]-1-methylethylene-co-1-[6-[3 (E)-(3,4-dimethoxyphenyl)acryloyloxy]hexyloxycarbonyl]-1-methylethylene]

poly [1-[10-[3 (E)-(4-ethoxy-3-propoxyphenyl)acryloyloxy]-decyloxycarbonyl]-1-methylethylene-co-1-[10-[3 (E)-(3,4-dimethoxyphenyl)acryloyloxy]decyloxycarbonyl]-1-methylethylene]

poly {1-[6-[3-[3-methoxy-4-(4-trans-pentylcyclohexyl-methoxy)phenyl]acryloyloxy]hexyloxycarbonyl-1-methylethylene} poly {1-[11-[3-[3-methoxy-4-(4-trans-pentylcyclohexyl-methoxy)phenyl]acryloyloxy]undecyloxycarbonyl]-1-methylethylene} poly {1-[6-[3-[3-methoxy-4-(4-trans-pentylcyclohexyl-methoxy)phenyl]acryloyloxy]hexyloxycarbonyl]-1-methylethylene-co-1-[10-[3 (E)-(3,4-dimethoxyphenyl)-acryloyloxy]decycloxycarbonyl]-1-methylethylene} poly {1-[11-[3-[3-methoxy-4-(4-trans-pentylcyclohexyl-methoxy)phenyl]acryloyloxy]undecyloxycarbonyl]-1-methylethylene-co-1-[80-[3 (E)-(4-ethoxy-3-propoxyphenyl)-acryloyloxy]octylcarbonyl]-1-methylethylene} poly {1-[6-[3 (E)-(2-ethoxy-4'-methoxybiphenyl-4-yl)acryloyloxy]hexyloxycarbonyl]-1-methylethylene} poly {1-[11-[3 (E)-(2-ethoxy-4'-methoxybiphenyl-4-yl)acryloyloxy]undecyloxycarbonyl]-1-methylethylene} poly {1-[6-[3 (E)-(2-ethoxy-4'-methoxybiphenyl-4-yl)acryloyloxy]hexyloxycarbonyl]-1-methylethylene-co-1-[11-[3 (E)-(2-ethoxy-4'-methoxybiphenyl-4-yl)acryloy

EXAMPLE 7

Poly[1-[6-[3(E)-(3-ethoxy-4-methoxyphenyl)
acryloyloxy]hexyloxycarbonyl]-1-methylethylene-
co-1-[2-ethylhexyloxycarbonyl]-1-methylethylene]

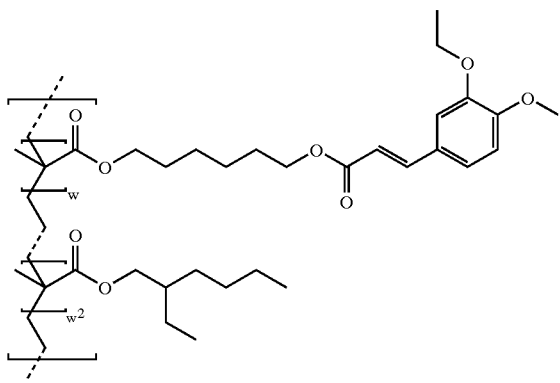

0.34 g (0.91 mmol) of 6-[3(E)-(3-ethoxy-4-methoxyphenyl)acryloyloxy]hexyl 2-methacylate, 0.01 g (0.05 mmol) of 2-ethylhexyl methacrylate (Fluka 64072) and 1.6 mg (0.0095 mmol) of 2,2'-azobisisobutyronitrile are dissolved in 1.9 ml of tetrahydrofuran (THF). The solution is flushed with a gentle stream of argon for 30 minutes. The reaction vessel is then closed air-tight and is heated to 55° C. for 15 hours. Thereafter, the vessel is opened, and the solution is diluted with 2 ml of THF and is added dropwise to 0.9 l of diethyl ether while stirring vigorously at room temperature. The precipitated polymer is filtered off and is dried at 50° C. under reduced pressure from a water-jet pump. For further purification, the polymer is dissolved in about 5 ml of dichloromethane and again precipitated in 0.9 l of diethyl ether. This process is repeated until no more monomer is detectable by thin-layer chromatography. Filtration and drying at 50° C. under reduced pressure from a water-jet pump give poly[1-[6-[3(E)-(3-ethoxy-4-methoxyphenyl)acryloyloxy]hexyloxycarbonyl]-1-methylethylene-co-1-[2-ethylhexyloxycarbonyl]-1-methylethylene].

The 6-[3(E)-(3-ethoxy-4-methoxyphenyl)acryloyloxy] hexyl 2-methacrylate used as starting material is prepared analogously to the poly[1-[8-[3(E)-(4-ethoxy-3-propoxyphenyl)acryloyloxy]octyloxycarbonyl]-1-methylethylene] (Example 3).

The following polymers can be synthesized in an analogous manner:

poly[1-[6-[3(E)-(3-ethoxy-4-methoxyphenyl)acryloyloxy]-hexyloxycarbonyl]-1-methylethylene-co-1-[2-ethylhexyloxycarbonyl]-1-methylethylene] (9:1)
poly[1-[6-[3(E)-(3-ethoxy-4-methoxyphenyl)acryloyloxy]-hexyloxycarbonyl]-1-methylethylene-co-1-[2-ethylhexyloxycarbonyl]-1-methylethylene] (4:1)
poly[1-[11-[3(E)-(3-ethoxy-4-methoxyphenyl)acryloyloxy]-undecyloxycarbonyl]-1-methylethylene-co-1-[2-ethylhexyloxycarbonyl]-ethylene]
poly[1-[8-[3(E)-(3-ethoxy-4-methoxyphenyl)acryloyloxy]-octyloxycarbonyl]-1-methylethylene-co-1-hexyloxycarbonylethylene]
poly[1-[6-[3(E)-(3-ethoxy-4-methoxyphenyl)acryloyloxy]-hexyloxycarbonyl]-1-methylethylene-co-1-methoxycarbonyl-1-methylethylene]
poly[1-[6-[3(E)-(3-ethoxy-4-methoxyphenyl)acryloyloxy]-hexyloxycarbonyl]-1-methylethylene-co-1-ethoxycarbonyl-1-methylethylene]
poly[1-[6-[3(E)-(3-ethoxy-4-methoxyphenyl)acryloyloxy]-hexyloxycarbonyl]-1-methylethylene-co-1-propoxycarbonyl-1-methylethylene]
poly[1-[6-[3(E)-(3-ethoxy-4-methoxyphenyl)acryloyloxy]-hexyloxycarbonyl]-1-methylethylene-co-1-butyloxycarbonyl-1-methylethylene]
poly[1-[6-[3(E)-(3-ethoxy-4-methoxyphenyl)acryloyloxy]-hexyloxycarbonyl]-1-methylethylene-co-1-pentyloxycarbonyl-1-methylethylene]
poly[1-[6-[3(E)-(3-ethoxy-4-methoxyphenyl)acryloyloxy]-hexyloxycarbonyl]-1-methylethylene-co-1-hexyloxycarbonyl-1-methylethylene]
poly[1-[6-[3(E)-(3-ethoxy-4-methoxyphenyl)acryloyloxy]-hexyloxycarbonyl]-1-methylethylene-co-1-octyloxycarbonyl-1-methylethylene]
poly[1-[6-[3(E)-(3-ethoxy-4-methoxyphenyl)acryloyloxy]-hexyloxycarbonyl]-1-methylethylene-co-1-dodecyloxycarbonyl-1-methylethylene]
poly[1-[6-[3(E)-(3-ethoxy-4-methoxyphenyl)acryloyloxy]-hexyloxycarbonyl]-1-methylethylene-co-1-octadecyloxycarbonyl-1-methylethylene]
poly[1-[6-[3(E)-(3-ethoxy-4-methoxyphenyl)acryloyloxy]-hexyloxycarbonyl]-1-methylethylene-co-1-allyloxycarbonyl-1-methylethylene]
poly[1-[6-[3(E)-(3-ethoxy-4-methoxyphenyl)acryloyloxy]-hexyloxycarbonyl]-1-methylethylene-co-1-phenylethylene]
poly[1-[6-[3(E)-(3-ethoxy-4-methoxyphenyl)acryloyloxy]-hexyloxycarbonyl]-1-methylethylene-co-1-methoxycarbonylethylene]
poly[1-[6-[3(E)-(3-ethoxy-4-methoxyphenyl)acryloyloxy]-hexyloxycarbonyl]-1-methylethylene-co-1-butyloxycarbonylethylene]
poly[1-[6-[3(E)-(3-ethoxy-4-methoxyphenyl)acryloyloxy]-hexyloxycarbonyl]-1-methylethylene-co-1-cyanoethylene]
poly[1-[6-[3(E)-(2-ethoxy-4'-methoxybiphenyl-4-yl)-acryloyloxy]-hexyloxycarbonyl]-1-methylethylene-co-1-methoxycarbonyl-1-methylethylene]
poly[1-[6-[3(E)-(2-ethoxy-4'-methoxybiphenyl-4-yl)-acryloyloxy]hexyloxycarbonyl]-1-methylethylene-co-1-ethoxycarbonyl-1-methylethylene] (19:1)
poly[1-[6-[3(E)-(2-ethoxy-4'-methoxybiphenyl-4-yl)-acryloyloxy]hexyloxycarbonyl]-1-methylethylene-co-1-propoxycarbonyl-1-methylethylene]
poly[1-[6-[3(E)-(2-propoxy-4'-ethoxybiphenyl-4-yl)-acryloyloxy]hexyloxy-1-methylethylene-co-1-[2-methylpropoxycarbonyl]-1-methylethylene]
poly[1-[6-[3(E)-(2-propoxy-4'-ethoxybiphenyl-4-yl)-acryloyloxy]hexyloxy-1-methylethylene-co-1-butyloxycarbonyl-1-methylethylene]
poly[1-[6-[3(E)-(2-propoxy-4'-ethoxybiphenyl-4-yl)-acryloyloxy]hexyloxy-1-methylethylene-co-1-pentyloxycarbonyl-1-methylethylene]
poly[1-[6-[3(E)-(2-propoxy-4'-ethoxybiphenyl-4-yl)-acryloyloxy]hexyloxy-1-methylethylene-co-1-hexyloxycarbonyl-1-methylethylene]
poly[1-[6-[3(E)-(2-propoxy-4'-ethoxybiphenyl-4-yl)-acryloyloxy]hexyloxy]-1-methylethylene-co-1-[2-ethylhexyloxycarbonyl-1-methylethylene] (20:1)
poly[1-[6-[3(E)-(2-ethoxy-4'-methoxybiphenyl-4-yl)-acryloyloxy]hexyloxycarbonyl]-1-methylethylene-co-1-octyloxycarbonyl-1-methylethylene]
poly[1-[6-[3(E)-(2-ethoxy-4'-methoxybiphenyl-4-yl)-acryloyloxy]hexyloxycarbonyl]-1-methylethylene-co-1-undecyloxycarbonyl-1-methylethylene]
poly[1-[6-[3-[3-methoxy-4-(4-trans-pentylcyclohexylmethoxy)phenyl]acryloyloxy]

hexyloxycarbonyl]-1-methylethylene-co-1-dodecyloxycarbonyl-1-methylethylene)

poly[1-[8-[3-[3-methoxy-4-(4-trans-pentylcyclohexylmethoxy)phenyl]acryloyloxy]octyloxycarbonyl]-1-methylethylene-co-1-octadecyloxycarbonyl-1-methylethylene]

poly[1-[6-[3-[3-methoxy-4-(4-trans-pentylcyclohexylmethoxy)phenyl]acryloyloxy]hexyloxycarbonyl]-1-methylethylene-co-1-allyloxycarbonyl-1-methylethylene]

poly[1-[6-[3-[3-methoxy-4-(4-trans-pentylcyclohexylmethoxy)phenyl]acryloyloxy]hexyloxycarbonyl]-1-methylethylene-co-1-[2-phenoxyethoxycarbonyl]-1-methylethylene]

poly[1-[6-[3-[3-methoxy-4-(4-trans-pentylcyclohexylmethoxy)phenyl]acryloyloxy]hexyloxycarbonyl]-1-methylethylene-co-1-[2-phenylethoxycarbonyl]-1-methylethylene]

poly[1-[6-[3(E)-(2-ethoxy-4'-methoxybiphenyl-4-yl)-acryloyloxy]hexyloxycarbonyl]-1-methylethylene-co-1-phenylethylene]

poly[1-[6-[3(E)-(2-ethoxy-4'-methoxybiphenyl-4-yl)-acryloyloxy]hexyloxycarbonyl]-1-methylethylene-co-1-cyanoethylene]

What is claimed is:
1. A polymer of the general formula I:

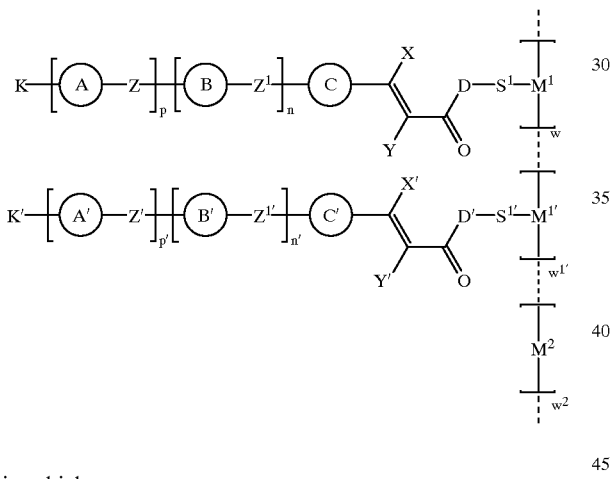

in which
M$^1$ and M$^{1'}$ denote a recurring monomer unit from the group:
acrylate, methacrylate, 2-chloroacrylate, 2-phenylacrylate; acrylamide, methacrylamide, 2-chloroacrylamide and 2-phenylacrylamide which are optionally N-substituted by lower alkyl; vinyl ethers, vinyl esters, styrene derivatives, siloxanes;

M$^2$ denotes a recurring monomer unit from the group:
acrylate, methacrylate, 2-chloroacrylate, 2-phenylacrylate, acrylamide, methacrylamide, 2-chloroacrylamide and 2-phenylacrylamide which are optionally N-substituted by lower alkyl; vinyl ethers, vinyl esters; straight-chain or branched alkyl esters of acrylic or methacrylic acid, allyl esters of acrylic or methacrylic acid, alkyl vinyl ethers or esters, phenoxyalkyl acrylates or phenoxyalkyl methacrylates or hydroxyalkyl acrylates or hydroxyalkyl methacrylates, phenylalkyl acrylates or phenylalkyl methacrylates, the alkyl radicals having 1 to 20 carbon atoms; acrylonitrile, methacrylonitrile, styrene, 4-methylstyrene or siloxanes;

w, w$^1$ and w$^2$ are molar fractions of the comonomers with $0<w\leq1$, $0\leq w^1<1$ and $0\leq w^2\leq0.5$;

S$^1$ and S$^{1'}$, independently of one another, denote a spacer unit, wherein each spacer unit, independently, is a straight-chain or branched alkylene group —(CH$_2$)$_r$— which is optionally monosubstituted or polysubstituted by fluorine, chlorine or cyano, or a chain of the formula —(CH$_2$)$_r$—L—(CH$_2$)$_s$—, in which L denotes a single bond or a linking functional group, and r and s each represent an integer from 1 to 20 with the proviso that r+s is $\leq24$;

D, D', independently of one another, denote —O— or —NR$^2$—; in which R$^2$ denotes hydrogen or lower alkyl;

X, X', Y and Y', independently of one another, denote hydrogen, fluorine, chlorine, cyano, alkyl having 1 to 12 carbon atoms which is optionally substituted by fluorine and in which a CH$_2$ group or a plurality of non-neighboring CH$_2$ groups may optionally be replaced by O, —COO—, —OOC— and/or —CH=CH—;

A and A', independently of one another, denote phenylene, pyridine-2,5-diyl, pyrimidine-2,5-diyl, 1,3-dioxane-2,5-diyl, cyclohexane-1,4-diyl, piperidine-1,4-diyl or piperazine-1,4-diyl which is unsubstituted or optionally substituted by fluorine, chlorine, cyano, alkyl, alkoxy or fluoroalkoxy;

B and B', independently of another, denote phenylene, pyridine-2,5-diyl, pyrimidine-2,5-diyl, 1,4- or 2,6-naphthylene, 1,3-dioxane-2,5-diyl or cyclohexane-1,4-diyl which is unsubstituted or optionally substituted by fluorine, chlorine, cyano, alkyl, alkoxy or fluoroalkoxy;

C and C', independently of one another, denote phenylene which is unsubstituted or optionally substituted by fluorine, chlorine, cyano, alkyl, alkoxy or fluoroalkoxy, or pyrimidine-2,5-diyl, pyridine-2,5-diyl, 2,5-thiophenylene, 2,5-furanylene or 1,4- or 2,6-naphthylene;

K and K', independently of one another, denote hydrogen, fluorine, chlorine, cyano, nitro or a straight-chain or branched alkyl, alkoxy, alkyl-COO, alkyl-CO—NR$^3$ or alkyl-OCO group having 1 to 20 carbon atoms which is optionally substituted by fluorine, chlorine, cyano or nitro and in which one CH$_2$ group or a plurality of non-neighboring CH$_2$ groups may optionally be replaced by —O—, —CH=CH— or —C|C— and in which R$^3$ denotes hydrogen or lower alkyl;
with the proviso that at least one of the rings A, B and C and/or at least one of the rings A', B' and C' represents a phenylene radical which is substituted in the ortho or meta position to one of the linkage points by at least one alkoxy group or fluoroalkoxy group, and, if K denotes alkoxy or fluoroalkoxy, at least one of the rings A, B and C and/or at least one of the rings A', B' and C' represents a phenylene radical which is substituted by at least one further alkoxy group or fluoroalkoxy group;

Z, Z', Z$^1$ and Z$^{1'}$, independently of one another, denote a single covalent bond, —(CH$_2$)$_t$—, —O—, —CO—, —CO—O—, —O—OC—, —NR$^4$—, —CO—NR$^4$—, —R$^4$N—CO—, —(CH$_2$)$_u$—O—, —O—(CH$_2$)$_u$—, —(CH$_2$)$_u$—NR$^4$— or —NR$^4$—(CH$_2$)$_u$—; in which R$^4$ denotes hydrogen or lower alkyl;

t denotes an integer from 1 to 4;

u denotes an integer from 1 to 3; and p, p', n and n', independently of one another, denote 0 or 1 excluding compounds wherein, simultaneously, n=p=0;
w=1;
$M^1$=acrylate, acrylamide, methacrylate or methacrylamide;
$S^1$=straight chain alkylene;
D=O or NH;
X=Y=H; and
C=dimethoxy-substituted phenylene.

2. A polymer as claimed in claim 1, in which $M^1$, $M^2$, $S^1$ and K have the meanings stated in claim 1 and in which D denotes oxygen;
X and Y denote hydrogen;
w denotes 0<w<1;
$w^1$ denotes 0;
$w^2$ denotes 0<$w^2$<0.5;
p denotes 0;
n denotes 0 or 1;
$Z^1$ denotes a single covalent bond, —CH$_2$CH$_2$—, —O—, —CH$_2$—O—, —O—CH$_2$—, —CO—O— or —O—OC—;
C denotes phenylene, pyridine-2,5-diyl or pyrimidine-2,5-diyl which is unsubstituted or substituted by alkoxy or fluoroalkoxy; and
B denotes phenylene, pyridine-2,5-diyl, pyrimidine-2,5-diyl, cyclohexane-1,4-diyl or dioxane-1,5-diyl which is unsubstituted or substituted by alkoxy or fluoroalkoxy; with the proviso that at least one of the rings B and C represents a phenylene radical which is substituted by at least one alkoxy group or fluoroalkoxy group and, if K denotes alkoxy or fluoroalkoxy, at least one of the rings B and C represents a phenylene radical which is substituted by at least one further alkoxy group or fluoroalkoxy group.

3. A polymer as claimed in claim 2, in which $M^1$, $S^1$, D, X, Y, K, $Z^1$, B, C, n and p have the meaning stated in claim 2 and in which w denotes 1;
$w^1$ denotes 0 and
$w^2$ denotes 0.

4. A polymer as claimed in claim 2, in which $M^1$, $M^2$, $S^1$, D, X, Y, K, $Z^1$, n, p, w, $w^1$ and $w^2$ have the meaning stated in claim 2 and in which B denotes phenylene which is unsubstituted or substituted by alkoxy or fluoroalkoxy, or cyclohexane-1,4-diyl; and
C denotes phenylene which is unsubstituted or substituted by alkoxy or fluoroalkoxy, with the proviso that one of the phenylene radicals present is substituted by at least one alkoxy group or fluoroalkoxy group and, if K denotes alkoxy or fluoroalkoxy, at least one of the phenylene radicals present is substituted by at least one further alkoxy group or fluoroalkoxy group.

5. A polymer as claimed in claim 4, in which $M^1$, $S^1$, D, X, Y, K, $Z^1$, B, C, n and p have the meaning stated in claim 4 and in which w denotes 1;
$w^1$ denotes 0 and
$w^2$ denotes 0.

6. A polymer which comprises
poly [1-[6-[3 (E)-(3,4-dimethoxyphenyl)-acryloyloxy]-hexyloxycarbonyl]-1-methylethylene]
poly [1-[11-[3 (E)-(3,4-diethoxyphenyl)-acryloyloxy]-undecyloxycarbonyl]-1-methylethylene]
poly [1-[11-[3 (E)-(3,4-dimethoxyphenyl)-acryloyloxy]-undecyloxycarbonyl]-1-methylethylene]
poly [1-[8-[3 (E)-(4-ethoxy-3-propoxyphenyl)-acryloyloxy]-octyloxycarbonyl]-1-methylethylene]
poly {1-[6-[3-[3-methoxy-4-(4-trans-pentycyclohexyl-methoxyphenyl]acryloyloxy]hexyloxycarbonyl-1-methylethylene} or
poly [1-[6-[3 (E)-(2-ethoxy-4'-methoxybiphenyl-4-yl)-acryloyloxy]hexyloxycarbonyl]-1-methylethylene].

7. An orientation layer for liquid crystals, which comprises a polymer as claimed in claim 1 applied to a carrier material.

8. A hybrid layer for use in an optical element, which comprises an orientation layer as claimed in claim 7 in contact with crosslinkable low molecular weight liquid crystals.

9. An optical component, which comprises a polymer as claimed in claim 1.

10. An optical component, which comprises an orientation layer as claimed in claim 7.

11. The polymer as claimed in claim 1, wherein the alkyl radicals of $M^2$ contain 5 to 20 carbon atoms.

12. The polymer as claimed in claim 11, wherein the alkyl radicals contain 5 to 18 carbon atoms.

13. The polymer as claimed in claim 1, wherein the linking functional group is —O—, —COO—, —OOC—, —NR$^1$—, —NR$^1$—CO—, —CO—NR$^1$—, —NR$^1$—COO—, —OCO—NR$^1$—, —NR$^1$—CO—NR$^1$—, —CH=CH— or —C=C—, in which R$^1$ denotes hydrogen or lower alkyl.

* * * * *